United States Patent
Fujita

(10) Patent No.: US 7,346,571 B1
(45) Date of Patent: Mar. 18, 2008

(54) AUTOMATED BID DECISION TECHNIQUE

(75) Inventor: Satoru Fujita, Tokyo (JP)

(73) Assignee: NEC Corporation, Tokyo (JP)

(*) Notice: Subject to any disclaimer, the term of this patent is extended or adjusted under 35 U.S.C. 154(b) by 928 days.

(21) Appl. No.: 09/692,455

(22) Filed: Oct. 20, 2000

(30) Foreign Application Priority Data

Oct. 20, 1999 (JP) ................................ 11-298374

(51) Int. Cl.
  *G06Q 40/00* (2006.01)
(52) U.S. Cl. ...................... 705/37; 705/26; 705/27; 705/35; 705/36; 705/38; 705/80
(58) Field of Classification Search ................ 705/26, 705/27, 37, 38, 39, 40, 35, 36, 80
  See application file for complete search history.

(56) References Cited

U.S. PATENT DOCUMENTS

| | | | | |
|---|---|---|---|---|
| 5,615,109 | A * | 3/1997 | Eder | 705/8 |
| 6,415,270 | B1 * | 7/2002 | Rackson et al. | 705/37 |
| 6,598,026 | B1 * | 7/2003 | Ojha et al. | 705/26 |
| 6,718,312 | B1 * | 4/2004 | McAfee et al. | 705/37 |

FOREIGN PATENT DOCUMENTS

| | | |
|---|---|---|
| JP | 9-259106 | 10/1997 |
| JP | 10-294770 | 11/1998 |
| JP | 11-232354 | 8/1999 |
| JP | 2002-507015 | 3/2002 |
| WO | WO99/14695 | 3/1999 |
| WO | WO99/27476 | 6/1999 |

OTHER PUBLICATIONS

Goto, Yukio. Introduction to Business Administration. Japan. Zeimukeiri Kyokai. May 1, 1999, first edition, 16th printing, pp. 231-254.
Q. Huai et al., "Mobile agents in an electronic auction house", pp. 1-10, (1999).
A. Chavez et a;. "Kasbah: An Agent Marketplace for Buying and Selling Goods", pp. 1-14, (1996).
P.R. Wurman et al., "The Michigan Internet AuctionBot: A Configurable Auction Server for Human and Software Agents", pp. 1-8, (1999).

* cited by examiner

*Primary Examiner*—Nga Nguyen
(74) *Attorney, Agent, or Firm*—Foley & Lardner LLP

(57) ABSTRACT

An automated bid decision system allowing a bidder to make a bidding for plural commodity items over a plurality of markets is disclosed. A data memory stores a logical formula representing a relationship among a plurality of bid items, a value table of the bid items, price information of the bid items in at least one market, a total purchasing fund, and a bidding strategy. A profit computation section computes a profit obtainable when at least one bid item arbitrary selected from the bid items is purchased, based on the value and the price information. A strategy computation section determines a list of bid items for which a bid should be made and a gross profit obtainable therefrom. A combination candidate is selected from the bid items based on the relationship formula and a possible profit obtainable from the selected combination candidate is computed. The final list of bid items are determined so as to maximize the possible profit within the total purchasing fund.

27 Claims, 25 Drawing Sheets

AUTOMATED BID DECISION TECHNIQUE

BACKGROUND OF THE INVENTION

1. Field of the Invention

The present invention generally relates to an automated bidding system, and in particular to a system and method for deciding a combination of bids (commodities, goods, and/or services for bid) in such a way as to maximize the present or future profit obtainable therefrom in the case where the bidding is for a plurality of items.

2. Description of the Related Art

When the practical use of the on-line auction on a network has become possible, an automatic bidding price decision system has been developed which is designed to automatically decide bidding prices by using an agent or by establishing a specific auction protocol of an auction server.

According to a paper written by P. R. Wurman, M. P. Wellman and W. E. Walsch "The Michigan Internet AuctionBot: A configurable Auction Server for Human and Software Agents" (Second International Conference on Autonomous Agents, 1999), they have developed an automatic bidding system for enabling the individual bidders to make a successful bid for purchasing a desired item at a reasonable price by using an auction server employing the Vickrey Auction based on a protocol such that a bidder is allowed to make a successful bid at the second highest bidding price, if the bidder makes bidding at the highest price representing the highest value of the item which the bidder desires to buy.

According to another paper written by A. Chavez and P. Maes "Kasbah: An Agent Marketplace for Buying and Selling Goods" (Proceedings of the First International Conference on the Practical Application of Intelligent Agents and Multi-Agent Technology, 1996), the automatic price adjustment by the agents in double auction has been made. In this system, a bidder desiring to purchase a commodity inputs the desired lowest price and highest price as well as a parameter for determining how the price increases by the end of bidding. On the other hand, a bidder desiring to sell the commodity inputs the desired lowest price and highest price and a parameter for determined how the price decreases by the end of bidding. This information is used for each agent to raise or fall the bidding price as required and decide a successful bidding price when it encounters with an agent proposing an acceptable price.

Q. Huai and T. Sandholm discuss a bidding server using the mobile agent (see "Mobile Agents in An Electronic Auction House" (Proceedings of Mobile Agents in the Context of Competition and Cooperation. 1999)). For instance, by using an incrementer agent, within the range of desired price of a bidder, a bidding at a higher price than the highest bidding price bid by another bidder can be made automatically. Further, this paper suggests the possibility of extension to bidding of plural commodities or to plural bidding servers, but it does not disclose how it is done.

In Federal Communications Commission of the United States an electronic bidding system for a radio communication license has been employed since 1994. Under this bidding system, the biddings for the grant of licenses covering plural regions are made in parallel and therefore a simultaneous multiple round auction system is adopted. This auction system, one based on the protocol differing from that of the English Auction, is designed not only for simultaneous multiple biddings but also for permitting the highest price bidder to withdraw its bidding by paying a certain penalty. Such a special auction protocol is effectively applicable to a bidding for plural commodity items in one market but is not effectively applicable to another bidding for plural commodity items over plural markets in cooperation with each other.

However, none of the above-described conventional bidding systems provides a bidder with a means for computing the profit obtainable from a proposed combination of the commodity items within a total purchasing fund. The reason is that a conventional bidding system primarily focuses on the automatic bidding for a single commodity and therefore a method for simultaneously computing the profits obtainable from plural items has not been established yet. In other words, environment for permitting the simultaneous bidding for plural items over plural markets has not been provided.

In addition, there has not been established any means for automatically providing a strategy on which a bidding is to be actually performed based on computed prospects for profits because there has not been proposed any method for theoretically and logically explaining the relationship among the profits from a plurality of items. Accordingly, a bidder, when bidding, cannot predict possible events occurring as the result of the bidding.

SUMMARY OF THE INVENTION

An object of the present invention is to provide a bidder supporting system and an automated bid decision system allowing a bidder to make a bid on plural commodity items over a plurality of markets.

Another object of the present invention is to provide an automated bid system allowing the presentation of a preferable combination of plural commodity items so as to obtain a maximum profit.

Further another object of the present invention is to provide a bidder supporting and automated bid system for providing a bidder with a means for computing the states of market for bidding, then presenting the strategy for real bidding.

According to the present invention, a system for deciding a bid item for which a bid is made, includes: a data memory for storing a logical formula representing a relationship among a plurality of bid items, a value table containing a value of each of the bid items, price information of each of the bid items in at least one market, a total purchasing fund, and a bidding strategy; a profit computation section for computing a profit obtainable when at least one bid item arbitrary selected from the plurality of bid items is purchased, based on the value and the price information of the at least one bid item; and a strategy computation section for determining at least one bid item for which a bid should be made and a gross profit obtainable from the determined at least one bid item, wherein the strategy computation section selects a combination candidate from the plurality of bid items based on the relationship formula, instructs the profit computation section to compute a possible profit obtainable from the selected combination candidate, and determines the at least one bid item so as to maximize the possible profit within the total purchasing fund.

The logical formula may represent a logical OR of the plurality of bid items wherein the strategy computation section determines a subset of bid items from the plurality of bid items so as to maximize the possible profit within the total purchasing fund.

The logical formula may represent a logical exclusive-OR of the plurality of bid items, wherein the strategy computation section determines a single bid item of the plurality of bid items so as to maximize the possible profit within the total purchasing fund.

The logical formula may represent a logical AND of the plurality of bid items, and the value table may further contain an added combinatorial value which will be obtained only when the plurality of bid items are all purchased, wherein the strategy computation section determines a list of bid items so as to maximize the possible profit within the total purchasing fund.

The logical formula may represent any combination of a logical OR, a logical exclusive-OR, and a logical AND of the plurality of bid items, wherein the logical OR represents a desire to maximize the possible profit within the total purchasing fund to obtain a subset of bid items from the plurality of bid items, the logical exclusive-OR represents a desire to determine a single bid item of the plurality of bid items so as to maximize the possible profit within the total purchasing fund, and the logical AND represents that an combinatorial value will be obtained only when a plurality of bid items related to the logical AND are all purchased.

The strategy computation section may further establish a bidding strategy taking into consideration a possible rise of a bidding price of each of the bid items due to participation of a third party to the bidding in the future.

According to another aspect of the present invention, an automated bidding system includes: a price collection device for automatically collecting price information of a bid item for which a bid is made in at least one market at regular intervals; the bid decision system as described above; and a bidding device performing a bid for the determined at least one bid item.

According to further another aspect of the present invention, a bid supporting system includes; a market observation device for automatically collecting price information of a bid item for which a bid is made in at least one market at regular intervals; the bid decision system as described above; and a bid recommendation device for representing the determined at least one bid item as recommendable information reflecting price variations in the market.

The automated bidding system may further includes a mobile agent, wherein, after the relationship formula, the value table, the total purchasing fund, and the bidding strategy have been input, the automated bidding system is transferred from a user's computer to a continuously operating computer to allow periodical market observation.

The bid supporting system may further include a mobile agent, wherein, after the relationship formula, the value table, the total purchasing fund, and the bidding strategy have been input, the bid supporting system is transferred from a user's computer to a continuously operating computer to allow periodical market observation.

As described above, the bid decision system according to the present invention stores a logical formula representing the relationship among a plurality of bid items expressed in terms of OR, exclusive-OR, AND, or a combination thereof, price information of each bid item in each market, a total purchasing fund, and a bidding strategy. Based on these inputs, a finally decided bid item group and the obtainable profits therefrom are determined. Therefore, the user is provided with the information about a combination of items which can promise the largest possible profit. In other words, the bidders who have the criteria of values concerning the items in one or more market can be effectively supported.

The automatic bid system according to the present invention incorporates a market observation system for periodically and automatically collecting the price information and updating the stored price information. An automatic bidding system responding to actual price fluctuations can be easily constructed so as to make automated actual bidding. The present invention provides the users with a disclosed system of the profit computation for enabling them to compute the largest possible profit based on the information inputted by the users themselves at all times reflecting market fluctuations.

The bid supporting system according to the present invention also incorporates the market observation system for automatically collecting actual price information by periodically observing the market, and supports the users by providing them either periodically or on demand with best recommendable bidding information based on the output from the automatic bid decision system.

DETAILED DESCRIPTION OF THE PREFERRED EMBODIMENTS

Hereafter, the word "item", "commodity" or "commodity item" is an item of goods and services for bid.

Automatic Bid Decision System

Figure 1:
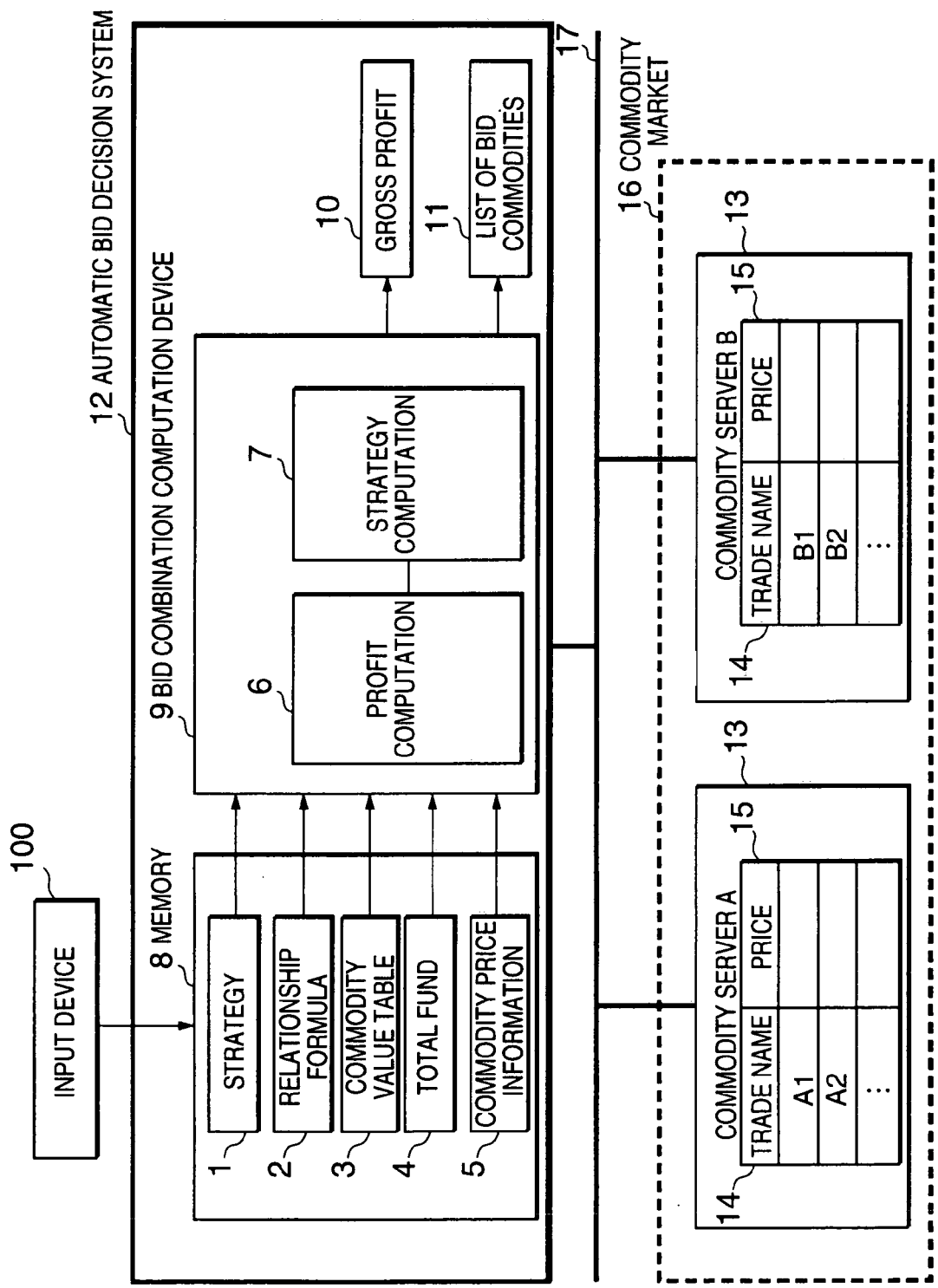
FIG. 1 is a block diagram showing an example of the system configuration of an automatic bid decision system according to a first embodiment of the present invention.

Referring to FIG. 1, an automatic bid decision system 12 in accordance with a first embodiment of the present invention is connected to a commodity market 16 via a computer network 17. The automatic bid decision system 12 is further connected to an input device 100 such as a keyboard or a file device.

The automatic bid decision system 12 is provided with a memory 8 and a bid combination computation device 9 including a profit computation section 6 and a strategy computation section 7.

The memory 8 stores a commodity bidding strategy 1, an item relationship formula 2, a commodity value table 3, a total purchasing fund 4, and current commodity price information 5, which are all received from the input device 100.

Figure 18:
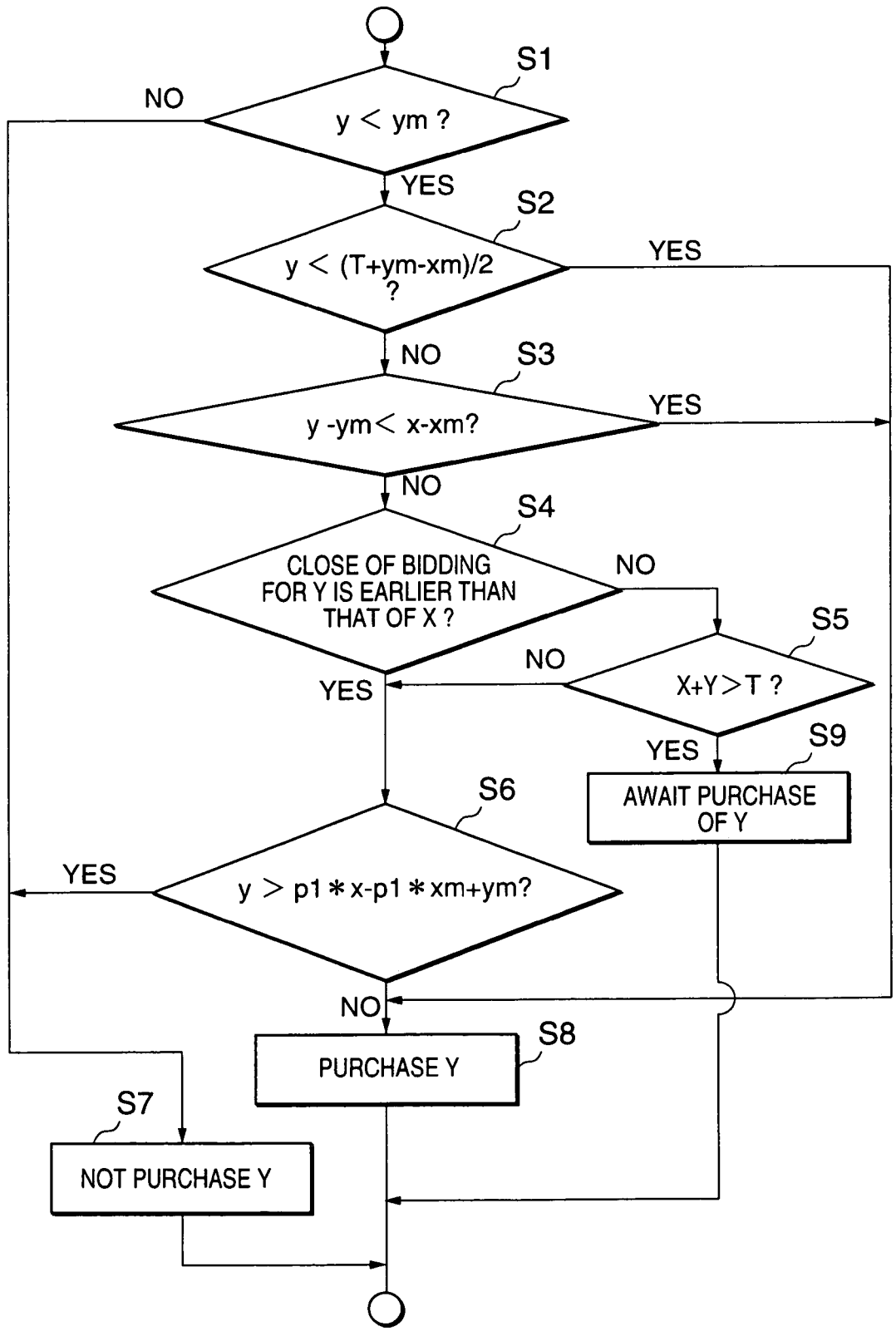
FIG. 18 is a flow chart showing a computation procedure of a bidding strategy in the case of two commodity items which are in OR-bidding relationship.
Figure 22:
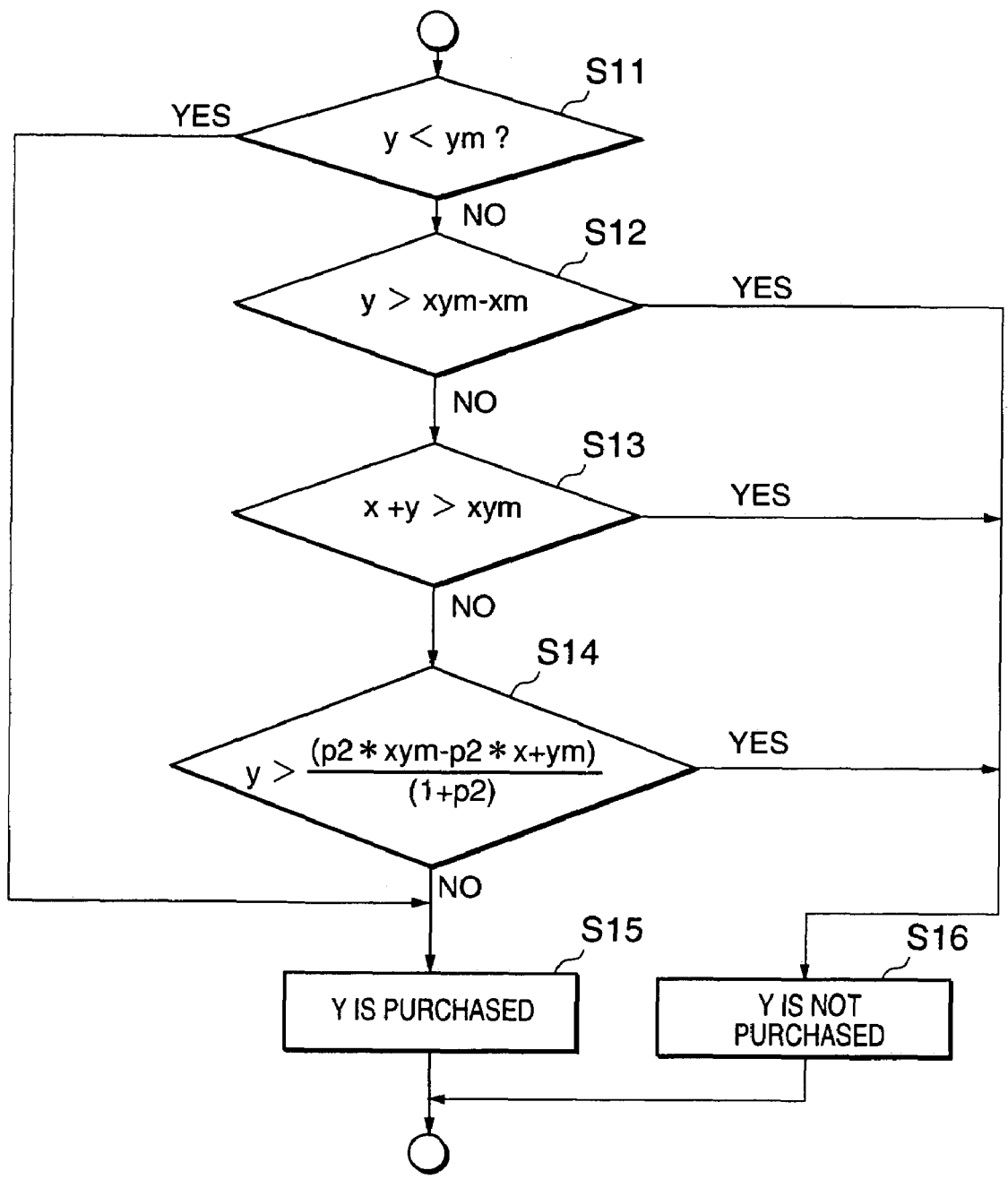
FIG. 22 is a flow chart showing a computation procedure of a bidding strategy in the case of two commodity items which are in AND-bidding relationship.

The commodity bidding strategy 1 is designed by a bidder through the input device 100, for example, such that commodities are purchased to maximize the profit at current commodity prices or that commodities are purchased taking into consideration an increase in bidding price caused by other bidders purchasing these. Commodities. The former strategy may be input in text and the latter strategy may be input in program as shown in FIGS. 18 and 22, as described later.

The item relationship formula 2 indicates a bidding relationship among buyer-desired commodity items, which is a combination of logical OR, exclusive-OR (XOR), and AND of buyer-desired commodity items, which will be described in detail later. The commodity value table 3 contains commodity values of individual commodities of individual groups of commodity items. The total purchasing fund 4 is the maximum amount of fund available for purchasing.

The above-described information is inputted from the memory 8 to the bid combination computation device 9, and the bid combination computation device produces a gross profit 10 and a list of bid commodities 11. The bid commodities list 11 indicates commodity items to be purchased to maximize the profit. The gross profit 10 indicates a profit that will be obtained if the listed commodities are purchased.

The profit computation section 6 computes a total of profits obtainable from one or more desired commodity items arbitrarily selected from the commodity items included in the item relationship formula 2 based on the commodity value table 3 and the commodity price information 5.

The strategy computation section 7 determines the bid commodities list 11 in such a way as to maximize the profit within the total purchasing fund 4, while as necessary instructing the profit computation section 6 to compute the total profits of combined bid commodity candidates, under the designated strategy 1 and also outputs the amount of total profits obtained therefrom.

The commodity market 16 includes a plurality of commodity servers 13. At each commodity server 13, prices of individual commodity items are displayed in a form of table consisting of a trade name (commodity name) field 14 and a price field 15. In each commodity server 13, some commodities may have fixed prices and some commodities may have floating prices that vary depending on the results of bidding. A fixed price commodity item can be purchased at the quoted price. On the other hand, as for a floating-price commodity, a current bidding price is displayed as a commodity price, and so the bidder who bid the highest price for that commodity by the end of bidding can make a successful bid.

The present embodiment of the present invention is applicable to the English auction for a single commodity, wherein the bidding prices are made open and only the biddings which contribute to the rise of the bidding price are acceptable, so that one who has made bidding at the highest price at the close of the bidding is entitled to purchase the bid commodity. The present embodiment is also applicable to the closed price auction, the Dutch auction, and the auction covering plural commodity items.

Automatic Bidding System

Figure 2:
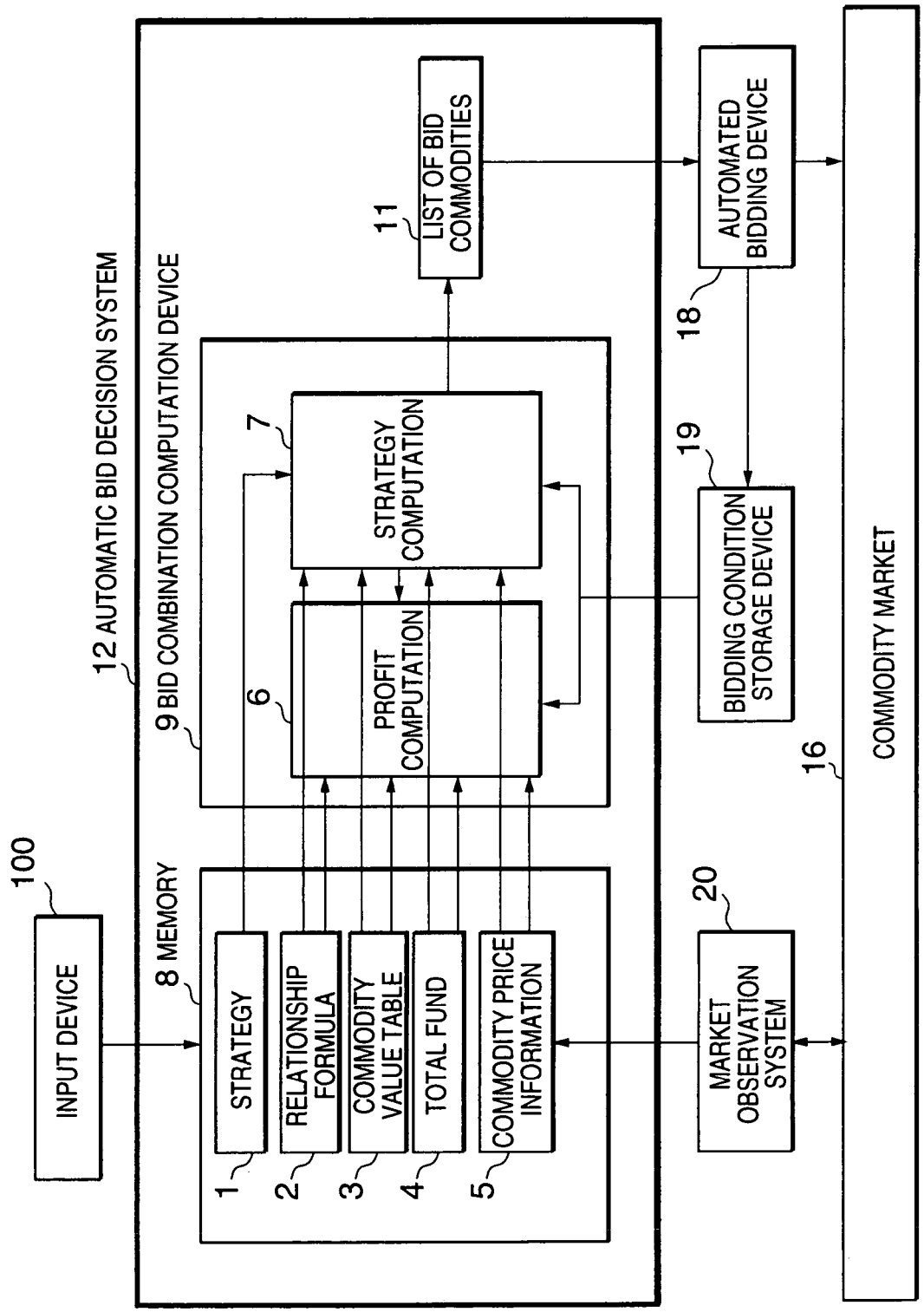
FIG. 2 is a block diagram showing an example of the system configuration of an automatic bidding system according to a second embodiment of the present invention.

Referring to FIG. 2, an automated bidding system employs the automatic bid decision system 12 as shown in FIG. 1, where blocks similar to those described in FIG. 1 are denoted by the same reference numerals and the details will be omitted.

The automated bidding system further includes an automated bidding device 18, a bidding condition storage device, and a market observation system 20. The market observation system 20 collects current commodity price information from the commodity market 16 at regular intervals or in response to a market price variation (event-driven) to perform the market survey. The latest price information obtained by the market observation system 20 is stored as price information 5 into the memory 8.

The automated bidding device 18 uses the bid commodities list 11 to automatically make a bid to the commodity market 16. For example, in the case where some items have not been bid, yet, among the items listed in the bid commodities list 11, the automated bidding device 18 communicates with a corresponding commodity server which accepts the bidding for the not-bid item and make a desired bid by transmitting its commodity name, a bidding price and a bidder name. Further, the bidding history thereof is stored in the bidding condition storage device 19, which is used as an input of the next profit computation and the strategic computation.

Bid Supporting System

Figure 3:
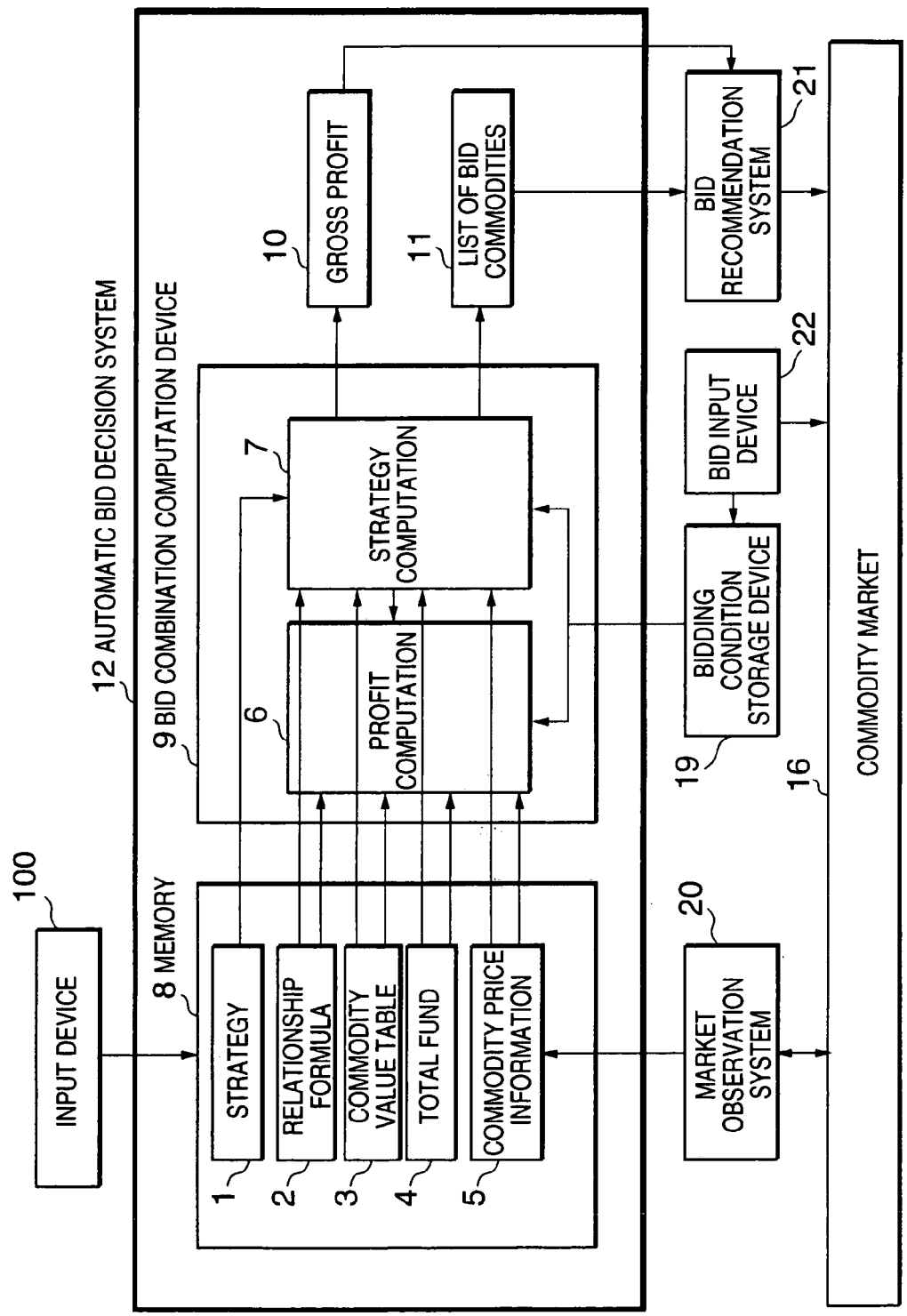
FIG. 3 is a block diagram showing an example of the system configuration of a bid supporting system according to a third embodiment of the present invention.

Referring to FIG. 3, a bid supporting system employs the automatic bid decision system 12 as shown in FIG. 1, where blocks similar to those described in FIGS. 1 and 2 are denoted by the same reference numerals and the details will be omitted.

The bid supporting system further includes a bid recommendation system 21 and a bidding device 22. The bid recommendation system 21 a presentation device such as a display, a printer, or an e-mail device, which inputs the gross profit 10 and the bid commodities list 11 from the bid combination computation device 9 and provides them to users so that the users can obtain the information about items recommendable for bidding in response to commodity price variation. The timing for a user to obtain the recommendation information can be set to the timing at which the user starts to use the automatic bid decision system 12. Alternatively, the automatic bid decision system 12 may be designed to be periodically operated to compute new bidding recommendation information (10, 11) and to provide the information to the users by means of a medium such as the electronic mail. Each bidder is allowed to make a bid to the commodity market 16 by manually operating the bid input device 22 such as an electronic mail or a browser, based on the bidding recommendation information. In this case, the bidding conditions thereof are stored in the bidding condition storage device 19 for use in the next profit computation and the strategic computation.

In the above-described systems as shown in FIG. 1 through FIG. 3, it is possible for a user to update the item relationship formula 2, commodity value table 3, and total purchasing fund 4 as necessary with the lapse of the time by using the input device 100. For instance, after having purchased a certain commodity by bidding, the factor of the purchased commodity is removed from the item relationship formula 2, and the amount corresponding to the purchased commodity is subtracted from the total purchasing fund 4. A new bid commodity can be additionally registered on the formula 2 and the commodity value table 3. Further, if the fund can be increased, then the total purchasing fund 4 is updated. In this way, the computation for deciding a bid combination reflecting a varying desire and availability of the purchasing fund can be made on continual basis.

Item Relationship Formula

In the above-described systems as shown in FIG. 1 through FIG. 3, the item relationship formula 2 can be expressed in logical form such as logical OR, exclusive OR (XOR), logical AND, or a combination thereof. The bid combination computation device 9 interprets the item relationship formula 2 to start bid decision processing.

More specifically, the logical OR of the desired bid items means that the number of bid items becomes as large as possible so as to maximize the profit obtainable by purchasing the possible number of items within the total purchasing fund. The bid combination computation device 9 interprets the meaning of the logical formula concerned to execute the corresponding bid decision processing.

The logical XOR of the desired bid items means that only one bid item is selected so as to maximize the profit obtainable from the single bid item. The bid combination computation device 9 interprets the meaning of the logical formula concerned to execute the corresponding bid decision processing.

The logical AND of the desired bid items means that a combinatorial value is obtained only when all the desired bid items are purchased within the total purchasing fund 4. The bid combination computation device 9 interprets the meaning of the logical formula concerned to execute the corresponding bid decision processing. In the case where the logical AND is involved, a user sets the combinatorial value, which is obtainable when all the desired bid items are purchased, in the bid commodity value table 3 in addition to the values of the individual bid items.

The function of each logical relationship involved in the item relationship formula 2 will be explained hereafter.

OR Bidding

It is assumed that there are n bid commodity items, and the present price of each bid commodity is assumed to be $x(i)$ ($i=1, 2 \ldots, n$). In the case of a bid commodity of fixed price, since such commodity can be purchased at the present price, the $x(i)$ corresponds to the purchasing price itself. In the case of the bidding, for example, the English auction, it is necessary for the bidder to make its bidding at a price slightly higher than the $x(i)$. However, assuming here that a difference between the price slightly higher than the $x(i)$ and the present price can be very small, the profit obtainable from the bidding made at the present price is computed. Further, the value of each bid commodity is set to $xm(i)$ as an input from the commodity value table 3.

The profit of a commodity is defined as a difference between the value of the commodity and its purchasing price, i.e., $(xm(i)-x(i))$. In the case where a plurality of items, which are combined in the form of logical OR, have been purchased, a total of profits obtained from individual items is assumed to be a gross profit.

Figure 4:
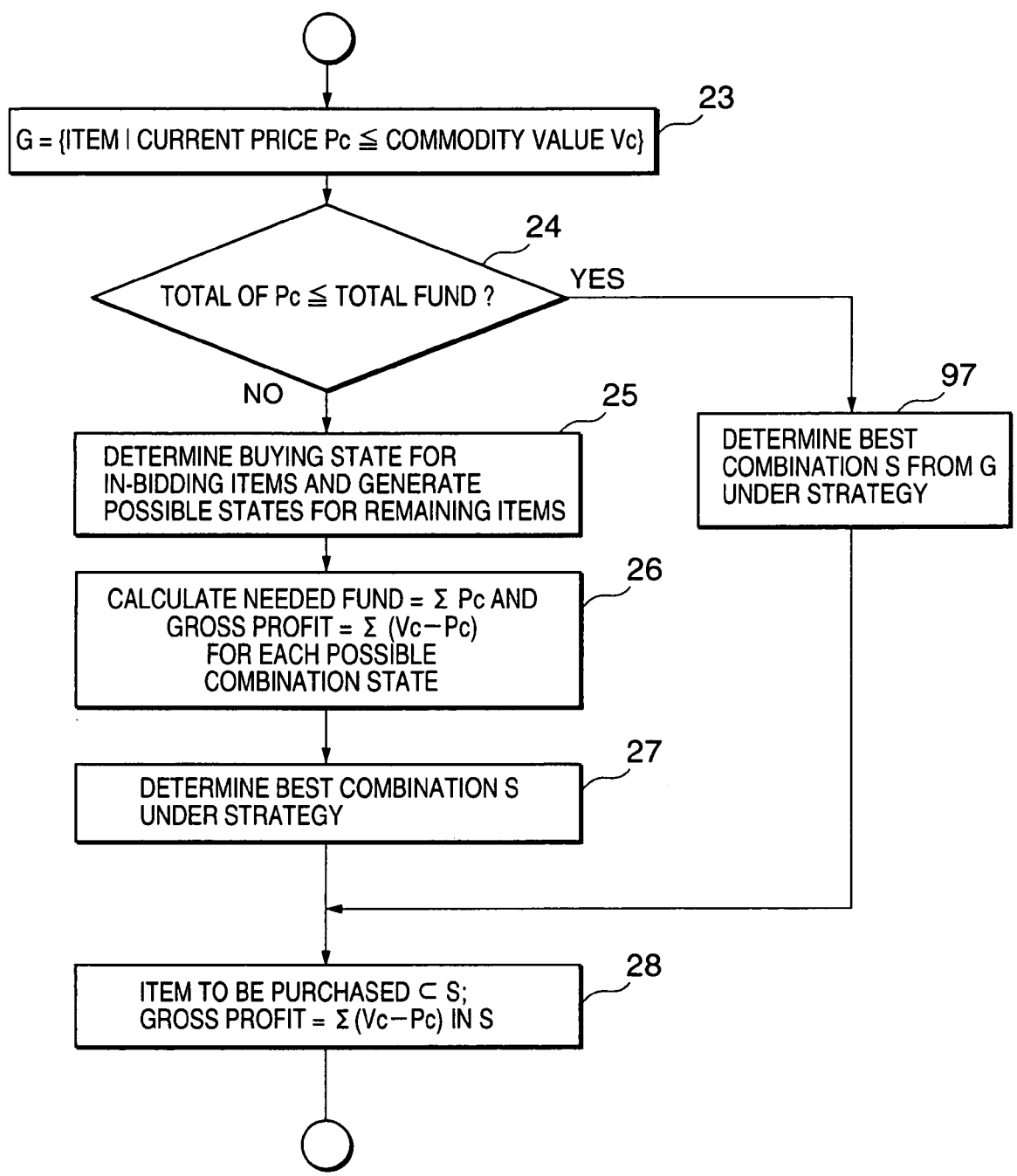
FIG. 4 is a flow chart showing a computation procedure of profit obtained from a plurality of commodity items which are in OR-bidding relationship.

Referring to FIG. 4, the strategy computation section 7 eliminates those items whose present prices (Pc) are higher than their values (Vc) from the objects of computation because of decreased total profit, and the remaining items are used to form a set G (step 23). Then, the strategy computation section 7 determines whether the total of the present prices Pc of the items in the set G is equal to or smaller than the total purchasing fund (step 24). When the total of Pc is not greater than the total purchasing fund (YES at step 24), the strategy computation section 7 determines the best combination S of items to be purchased by using the strategy 1 (step 97). For instance, when the strategy 1 is to be employed for maximizing the profit at the present price, all the items constituting the set G are supposed to be purchased and thus the set G becomes equal to the set S. Then, the strategy computation section 7 instructs the profit computation section 6 to determine the gross profit as a sum of differences obtained by subtracting the present prices from the values for all the items constituting the set S (step 28). The strategy computation section 7 outputs the gross profit 10 and the bid commodities list 11 and finishes the processing.

When the total of Pc is greater than the total purchasing fund (NO at step 24), it is necessary to establish the procedure for selecting a combination of items which maximize the profit from the items constituting the set G. Here, the following steps are performed.

It is first assumed that the items for which the biddings have already been made and are active, are to be purchased, while each of the remaining items is determined whether to be purchased or not to be purchased to produce $2^x$ possible states, where x is the number of the remaining items (step 25).

Thereafter, the strategy computation section 7 instructs the profit computation section 6 to calculate the needed fund (the sum of present prices of the items to be purchased) and the gross profit (the sum of profits obtained by subtracting the present price of each item to be purchased from the value of the same item) for each of the possible states (step 26). The strategy computation section 7 determines the best combination S of items to be purchased under the strategy 1 (step 27).

For instance, in the case where the strategy 1 is employed for the purpose of maximizing the profit at the present price level, a best combination of items, by which the gross profit can be maximized within the total purchasing fund, is the set S. Then, the combination of the items included in the set S and the above-described gross profit are outputted (step 28).

In the case where the strategy is designed to maximize the gross profit, another profit calculation method may be employed for efficiently generating a combination of items. For instance, it is assumed that, when it has been determined whether k (smaller than m) items are to be purchased or not, the fund needed for purchasing to-be-purchased items of the k items exceeds the total purchasing fund, where m is the number of items constituting the set G. In this case, it is not necessary to retrieve another combination of items, since it is obvious that the amount needed for purchasing any combinations of m-k items will exceed the total purchasing fund. Such pruning may reduce the retrieval load.

Further, as another method for simplifying the profit computation, there has been known a method for computing a maximum expected profit without the introduced fund exceeding the total purchasing fund by using the method called the dynamic programming to calculate a performance profile so as to keep the total profit for the introduced fund at maximum.

Figure 5:
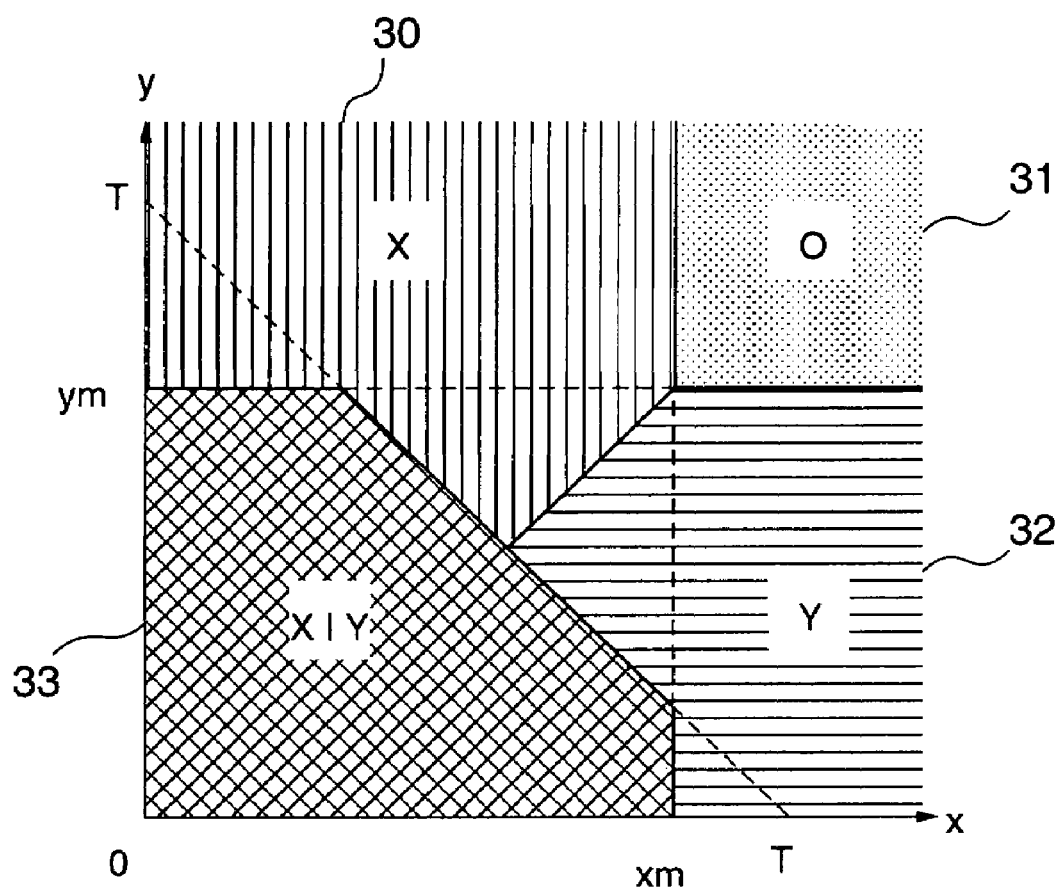
FIG. 5 is a graph showing a first example of a bidding method in the case of two commodity items which are in the OR-bidding relationship.

FIG. 5 is a graphic representation of the algorithm for computing the total profit obtainable from the purchased items in the case of purchasing only 2 items under the strategy for maximizing the total profit. In other words, in the case where the bidding is made for two items, the selection of the items and the total profit therefrom can be computed by solving the linear equation represented by the graph of FIG. 5.

In FIG. 5, the price of a commodity X is given as x; the price of a commodity Y as y; the value of the commodity Y as ym; the total fund as T. Further, in FIG. 5, it is assumed that T>xm, T>ym, and xm+ym>T.

First, a straight line represented by x=xm is used to determine whether the commodity X is to be purchased or not, depending on whether the present price is higher than the value. A straight line represented by y=ym serves similarly with respect to the commodity y. The region 31 for x>xm and y>ym represents the region where neither the commodity X nor Y will be purchased. The straight line represented by x+y=T indicates that the sum of the funds used for the commodity X and the commodity Y is equal to the total fund, and the region 33 represented by x+y≦T indicates that both (the commodity X and the commodity Y) can be purchased, provided that those items whose prices are higher than their values will not be purchased. The region represented by x+y>T corresponds to the region where either of the two items is purchased, or the both will not be purchased. The straight line represented by x−xm=y−ym serves as the border line for determining which of the two items yields greater profit when only one of the two items is to be purchased. In the case of x−xm>y−ym, the commodity Y should be purchased (region 32), while in the contrary case, the commodity X should be purchased (region 30). when the items are on the boundary line, equal profit can be obtained regardless of which of the two items is purchased.

By dividing the x-y plane by the above-mentioned lines, the area can be divided into the region where both the commodity X and Y should be purchased, the region where only the commodity X should be purchased, the region where only the commodity Y should be purchased, and the region where none should be purchased.

Figure 6:
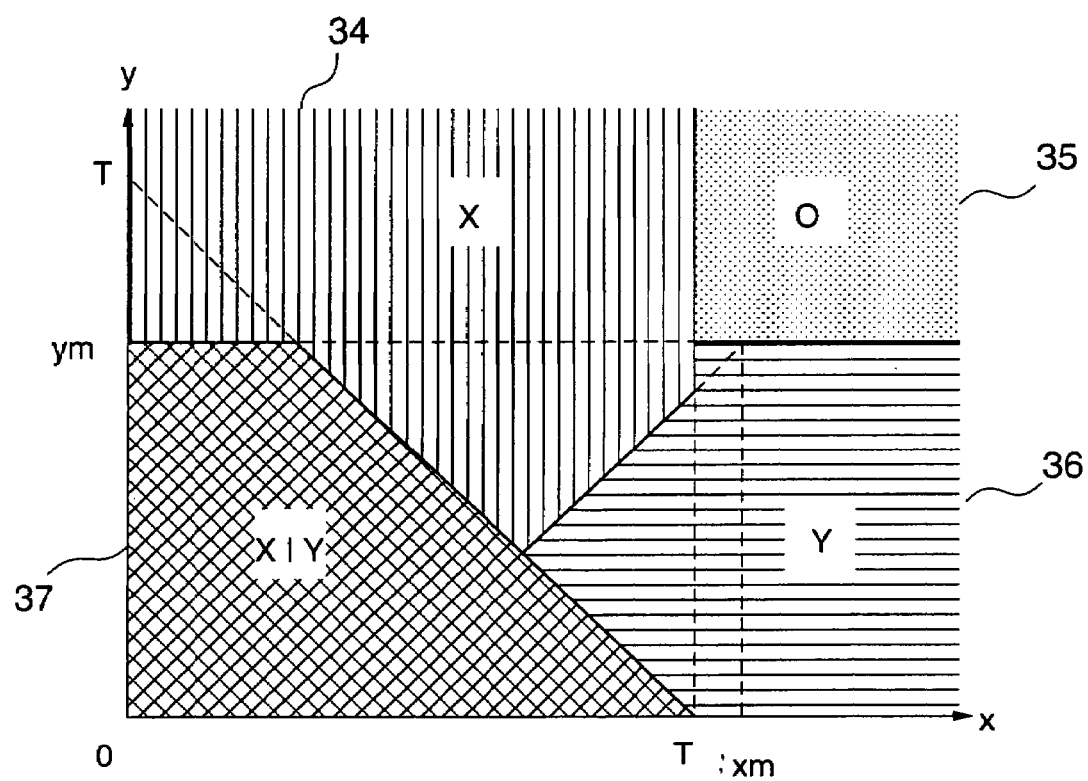
FIG. 6 is a graph showing a second example of a bidding method in the case of two commodity items which are in the OR-bidding relationship.

FIG. 6 shows the x-y plane divided according to T>ym and T<xm. FIG. 6 differs from FIG. 5 in that the price x of the commodity X is lower than xm, but it becomes higher than T depending on conditions.

Figure 7:
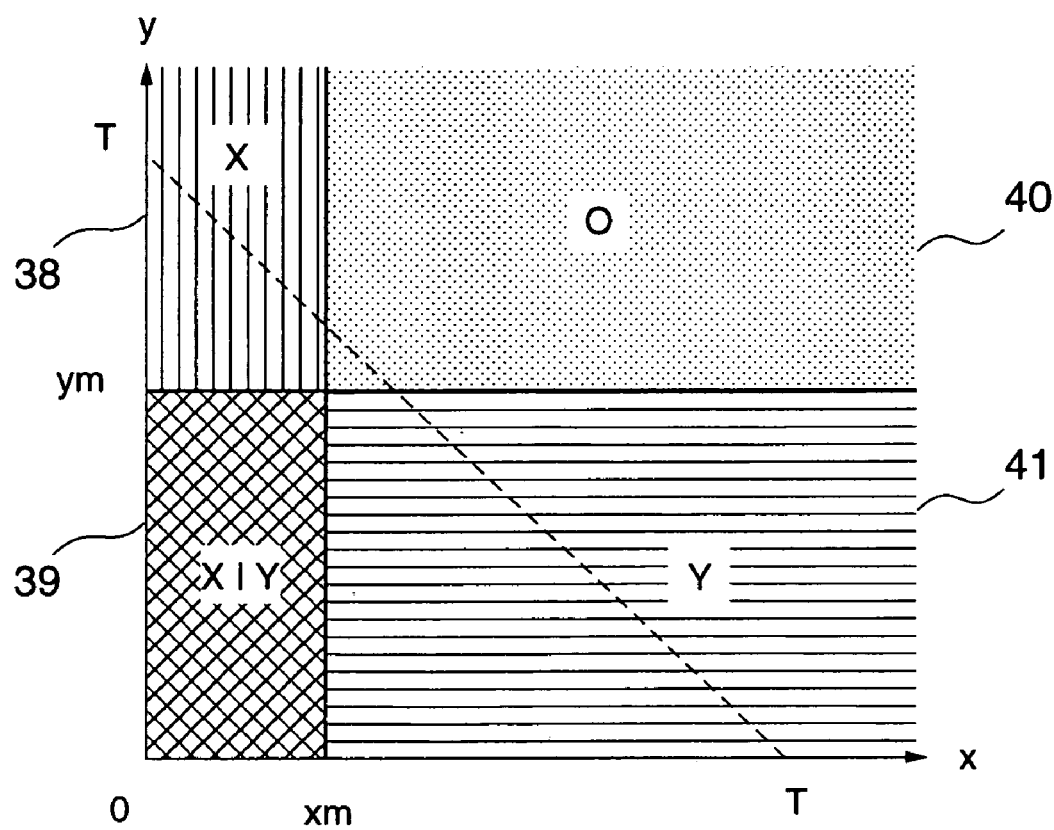
FIG. 7 is a graph showing a third example of a bidding method in the case of two commodity items which are in the OR-bidding relationship.

FIG. 7 shows the x-y plane divided according to the conditions; T>xm, T>ym and xm+ym<T. Since xm+ym is smaller than T, in the case of x<xm and y<ym, both items may be purchased at any time, and this differs from the case shown in FIG. 5. Such graphic representation enables a bidder to easily make decisions on which item should be purchased or not. For example, both items should be purchased when x<xm and y<ym (region 39); the commodity X should always be purchased where x<xm (region 38); the commodity Y should always be purchased when y<ym (region 41); and the no items should be purchased under other conditions (region 40).

XOR Bidding

Figure 8:
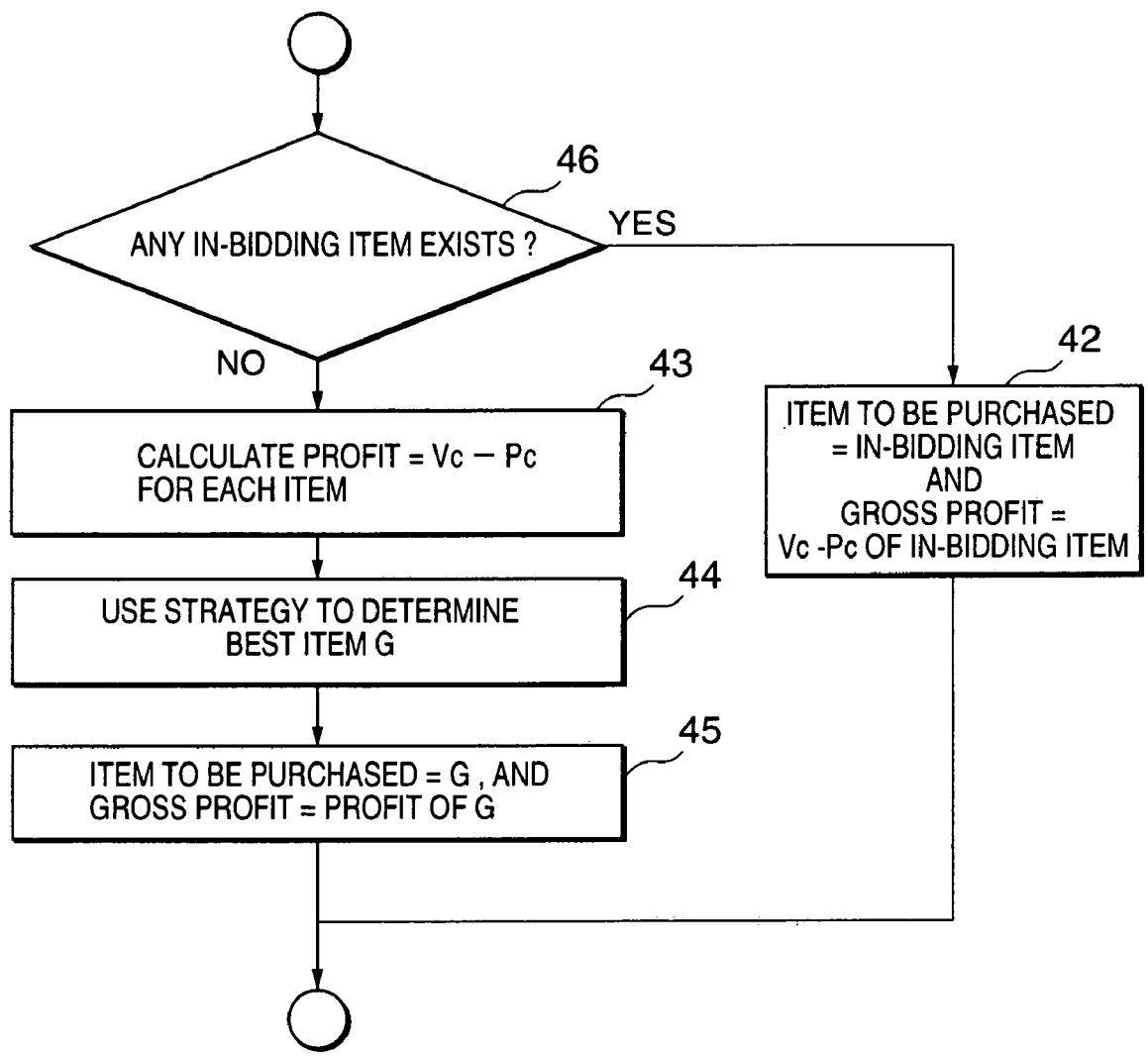
FIG. 8 is a flow chart showing a computation procedure of profit obtained from a plurality of commodity items which are in XOR-bidding relationship.

FIG. 8 shows the profit computation and recommendable bid item decision in the case where the item relationship formula 2 is expressed by the exclusive OR, and only one commodity is to be purchased under a certain strategy. First, the strategy computation section 7 determines whether there is already any in-bidding commodity item that is currently in bid (step 46). If an in-bidding item exists (YES at step 46), the strategy computation section 7 determines such an in-bidding item as an item to be purchased so as to continue the bidding for that item and instructs the profit computation section 6 to compute and output the gross profit as a difference between the value and the present price thereof (step 42).

When there is no currently bid item (NO at step 46), the profits expected from the individual bid items are computed by the profit computation section 6 (step 43). Then, based on the result of this computation, the strategy computation section 7 decides a best item g according to the strategy 1 (step 44). For instance, in the case where the strategy 1 is designed to maximize the total profit at the present price level, the commodity from which the largest profit can be expected is specified as the best commodity g. If, however, all the items are found to yield negative profits, the commodity g will not be selected and no items will be purchased. Then, the strategy computation section 7 determines the selected commodity g as a commodity to be purchased and outputs the profit obtained from the commodity g as the total profit (step 45).

Figure 9:
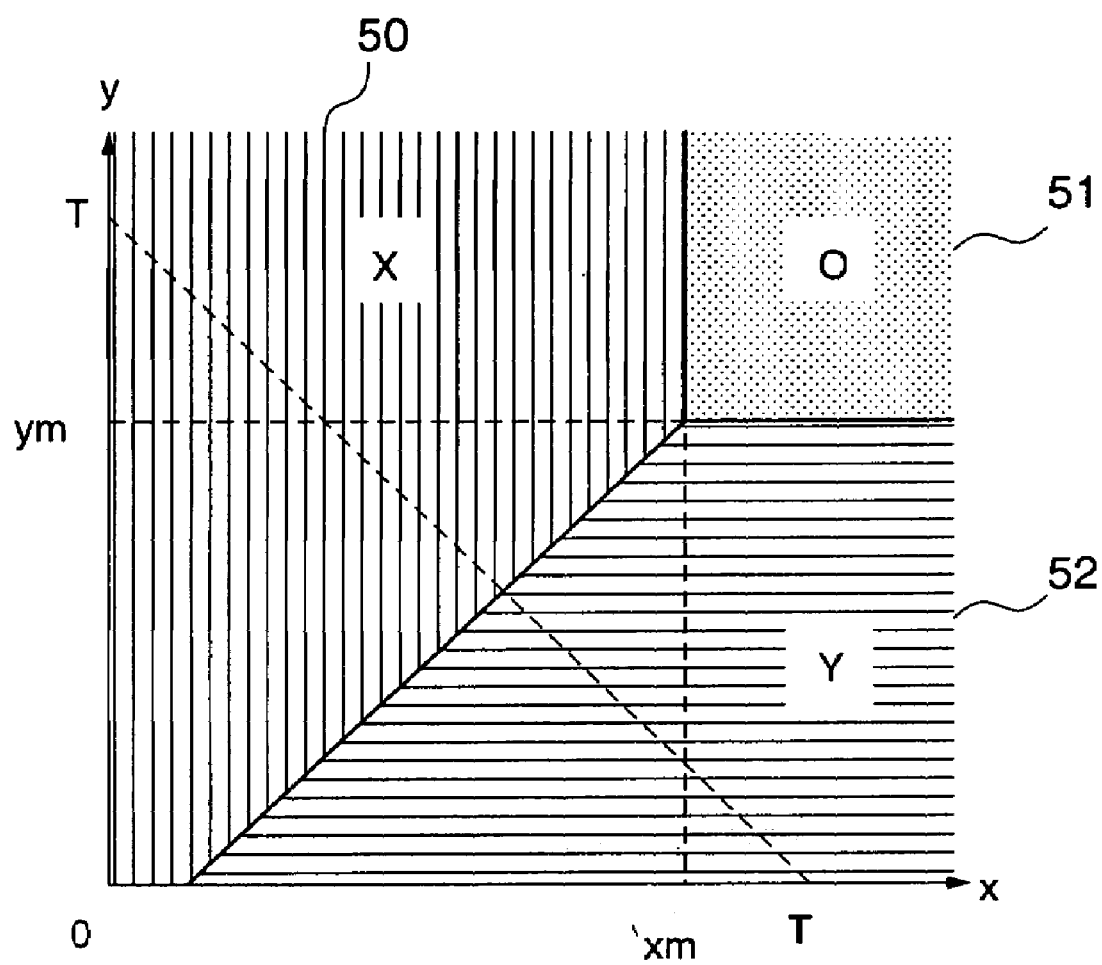
FIG. 9 is a graph showing a first example of a bidding method in the case of two commodity items which are in the XOR-bidding relationship.

FIG. 9 is a graphic representation of the algorithm for computing the best item and the gross profit according to the procedure as is represented by the flow chart of FIG. 8, when the strategy for maximizing the total profit is employed in the case of the bidding for only 2 items. In other words, in the case where the bidding is to be made for only 2 items, the selection of a bid commodity and the profit obtainable from such a bid commodity can be determined by solving the linear equation shown in FIG. 9.

In FIG. 9, the price of a commodity X is given as x: the price of a commodity Y as y; the value of the commodity X as xm; the value of the commodity Y as ym; and the total fund as T. Further, in FIG. 9, it is assumed that T>xm, T>ym and xm+ym>T. The straight line represented by x=xm is used to determine whether the commodity X should be purchased or not, depending on whether the present price thereof is higher than its value or not. Similarly, the straight line represented by y=ym relates to the commodity Y. The region 51 represented by x>xm and y>ym is a region where neither commodity X nor commodity Y is purchased. Under the condition of T>xm and T>ym, the region where x<xm and y<ym is divided by the straight line represented by x−xm=y−ym because it is profitable to purchase only one commodity promising a higher profit. In the case of x−xm>y−ym, the commodity Y should be purchased (region 52), and, in the contrary case, the commodity X should be purchased (region 50). On the border line, either of the two commodity may be purchased.

Figure 10:
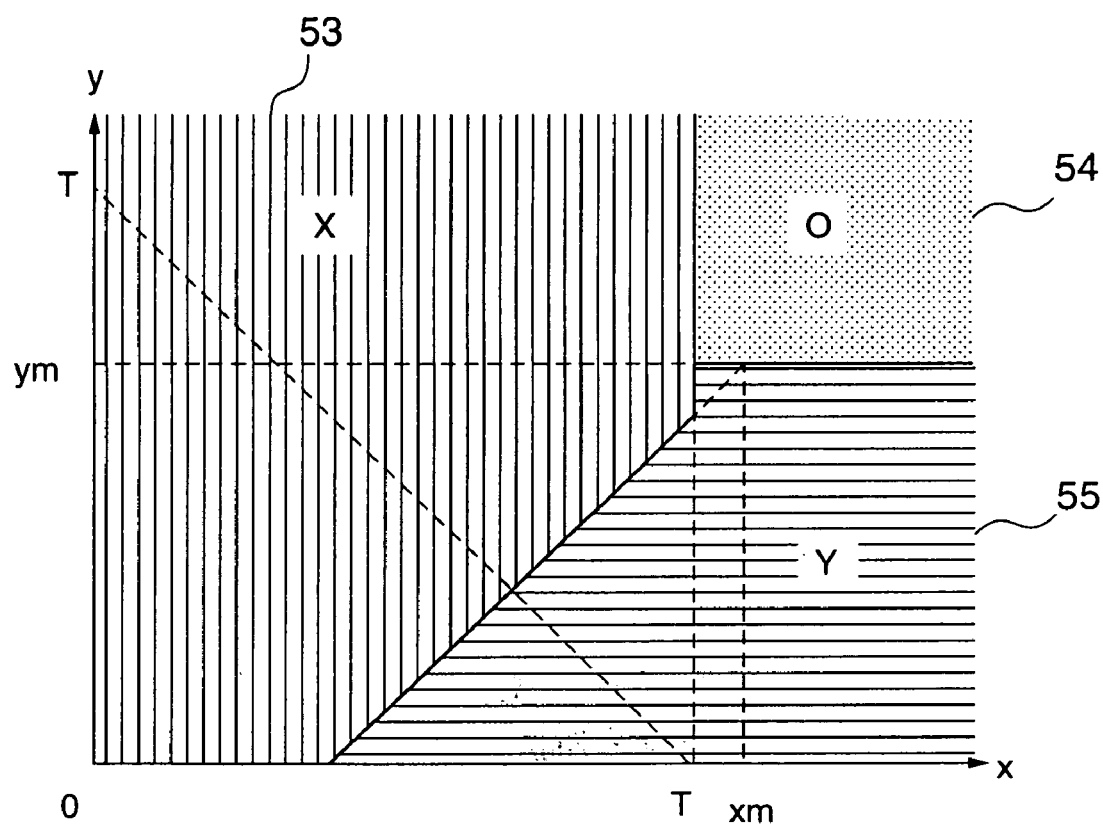
FIG. 10 is a graph showing a second example of a bidding method in the case of two commodity items which are in the XOR-bidding relationship.

FIG. 10 shows the division of the x-y plane under the condition of T>ym and T<xm. This case differs from the case of FIG. 9 in that the price x of the commodity X is lower than xm, but may be larger than T.

Figure 11:
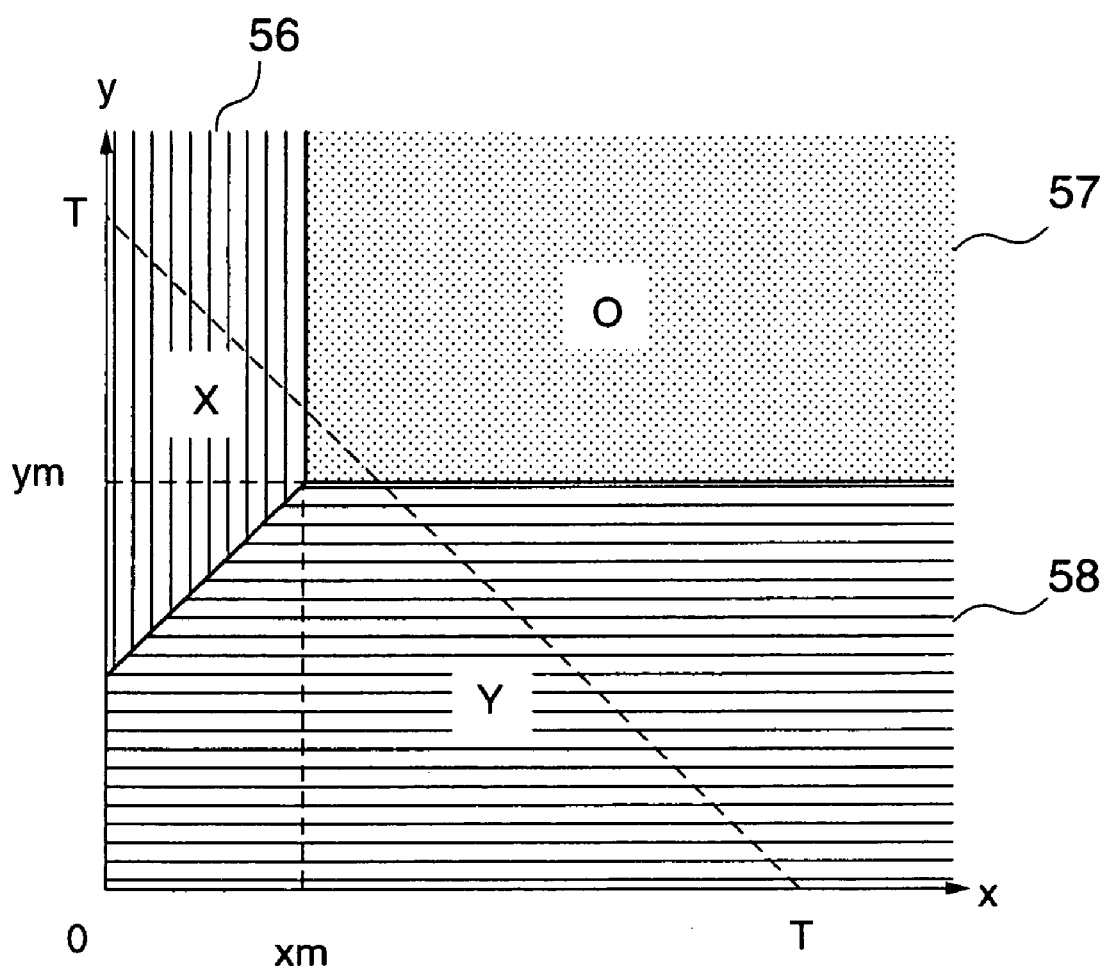
FIG. 11 is a graph showing a third example of a bidding method in the case of two commodity items which are in the XOR-bidding relationship.

FIG. 11 shows the division of the x-y plane under the condition of T>xm, T>ym, and xm+ym<T. The x-y plane is divided by the straight lines represented by x=xm, y=ym and x−xm=y−ym in the fashion similar to that in the case of FIG. 9.

AND Bidding

Figure 12:
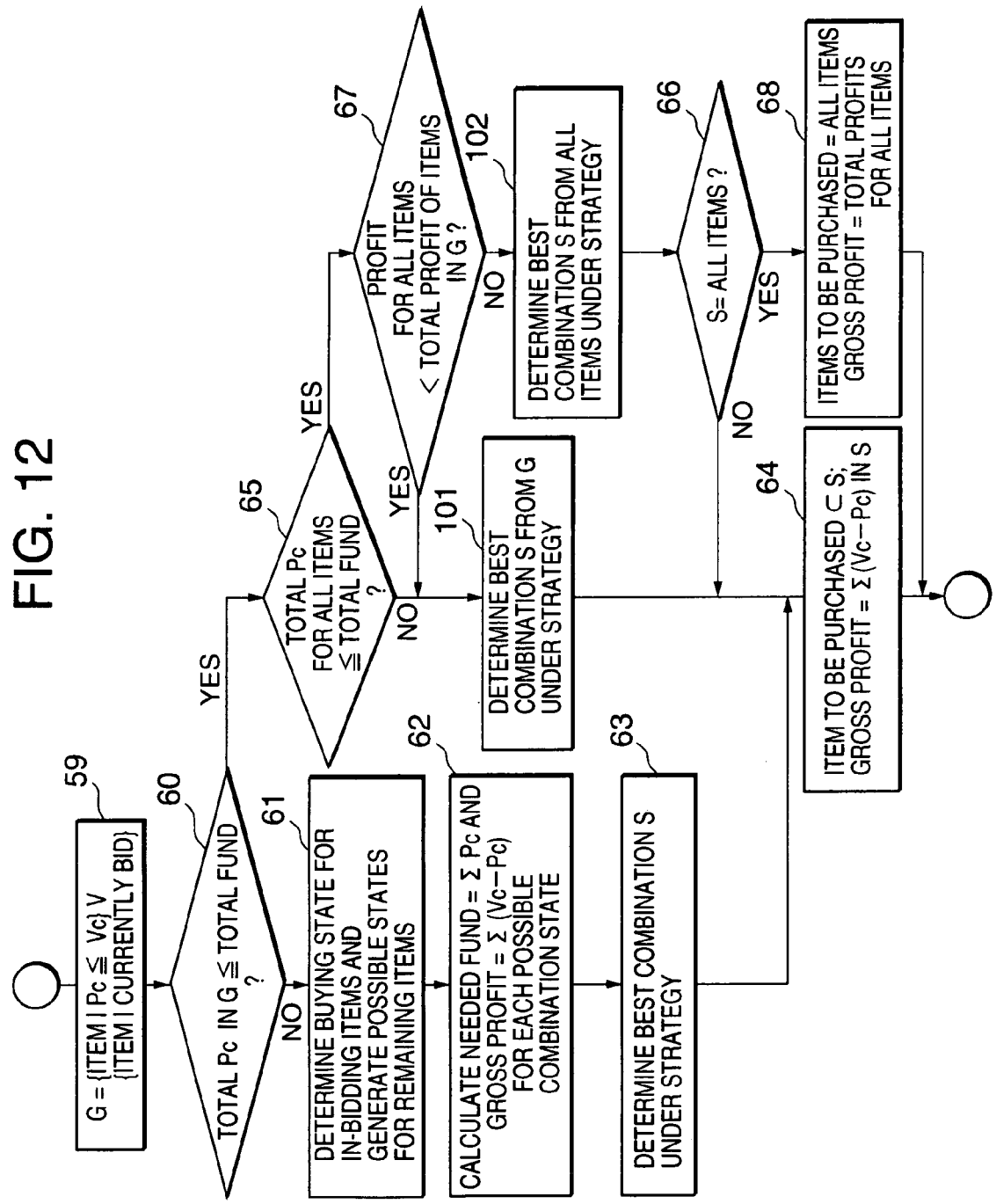
FIG. 12 is a flow chart showing a computation procedure of profit obtained from a plurality of commodity items which are in AND-bidding relationship.

FIG. 12 shows the process of profit computation and recommendable bid item decision under a certain strategy in the case where the item relationship formula 2 is expressed by AND. In the case of the AND-bidding relationship, in addition to the value xm (i) of each commodity, the total value xym of all the bid items, which will be obtained when all the bid items are purchased, are inputted to the commodity value table 3. In this case, since an extra value is assumed to be added when all the items are purchased, another condition that xym is larger than the total price of xm (i) should be required.

The strategy computation section 7 forms a union G of a first set including items each having the present price x(i) equal to or lower than the value xm (i) thereof and a second set of currently bid items (step 59). Next, the strategy computation section 7 compares the total of the present prices of the items constituting the set G, i.e., the total price of x (i), with the total fund (step 60). Since G is a subset of the whole set of all the items, if the total price of the items constituting the set G at the present prices is larger than the amount of the total fund, then this means that the total price of all the items at the present prices is also larger than the amount of the total fund. In such a case, since it is obvious that the bidder concerned is unable to purchase all the items, the strategy computation section 7 operates for finding a purchasable combination of items from among the valuable items constituting the set G and also for computing the bid commodities list and the gross profit obtainable from the listed bid items (steps 61-64). This process is equivalent to the steps 25-28 of FIG. 4.

On the other hand, when the total price of the items constituting the set G at the present prices is equal to or smaller than the total price of the fund (YES at step 60), the strategy computation section 7 checks whether the total price of all the items at the present prices is equal to or smaller than the amount of the total fund (step 65). If not (NO at step 65), it is obvious that the total fund is not sufficient to purchase all the items and therefore the strategy computation section 7 selects a valuable commodity group S from among the items registered for the set G under the strategy 1 (step 101). For instance, if the strategy 1 is for maximizing the total profit at the present price level, G and S become equal to each other. Lastly, the strategy computation section 7 outputs the total profit obtainable from the items constituting the group S (step 64).

When the total price of all the items is smaller than the total fund (YES at step 65), it is obvious that that all the items can be purchased. Then, the profit obtainable from all the items, (xym−(sum of the present prices of all the items)), is compared with the sum of the individual profits of the items constituting the set G, the sum of (xm (i)−x (i)) of the items constituting the set G (step 67). If the profit obtainable from all the items is larger (NO at step 67), then it is reasonable to purchase all the items, and the processing proceeds to step 102 where the strategy 1 is employed. For instance, when the strategy employed is designed to maximize the total profit at the present price level, the commodity group S is specified as a commodity group for purchasing all the items. Then, the profit is output as the sum of the profits of all the individual items (step 68), provided that it is checked whether the group S includes all the items at step 66. Otherwise, when it is found that the group S does not comprise all the items under another strategy, it is decided to purchase some of the items within the group S and to compute the profit obtainable therefrom (step 64).

On the other hand, if the sum of the individual profits of the items constituting the set G is larger than the total fund (YES at step 67), the items constituting the set G are to be purchased. Further, after a subset S of the set G has been determined under the strategy (step 101), the items within the set S will be selected as items to be purchased, and the total profit obtainable therefrom will be the sum of the individual profits from the items within the set S (step 64). For instance, when the strategy 1 is designed to maximize the total profit at the present price level. S and G become equal to each other.

Figure 13:
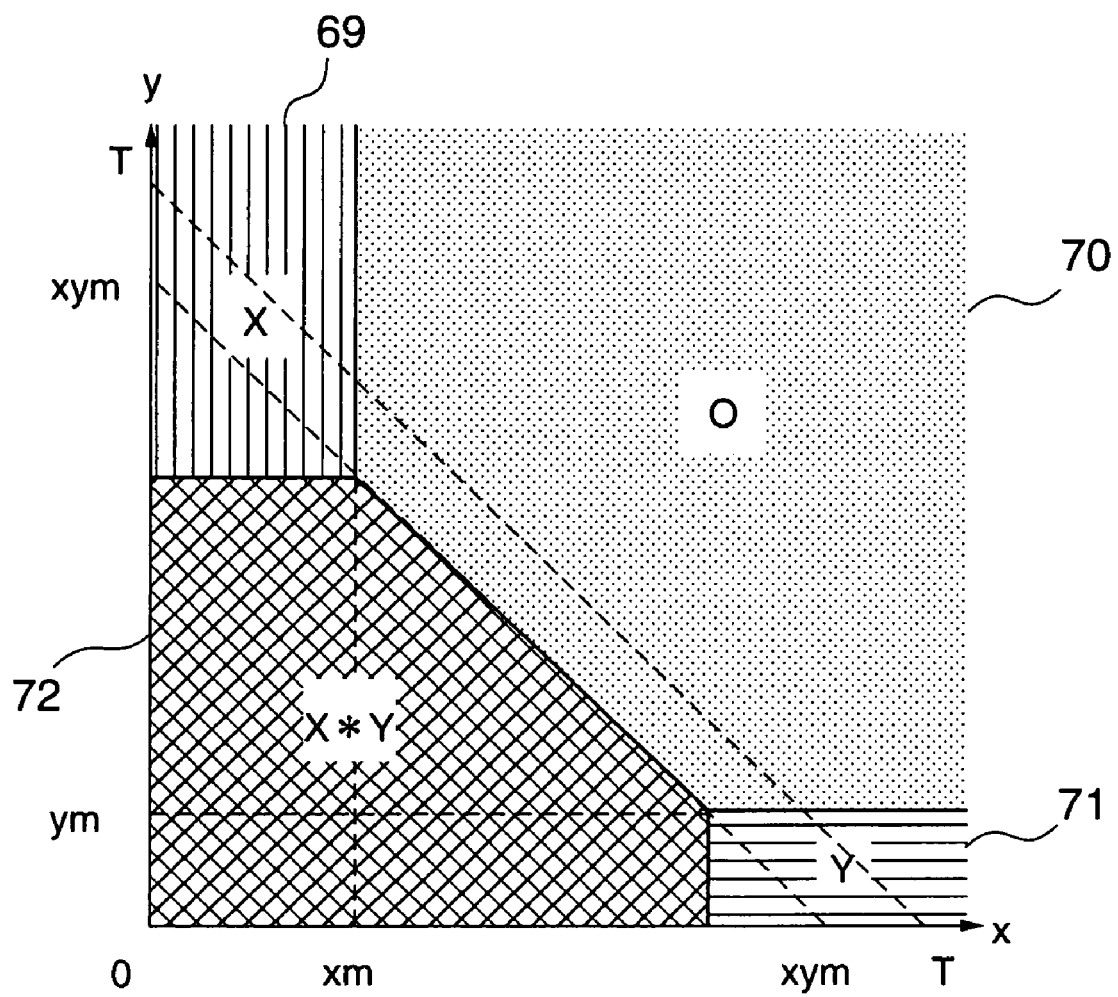
FIG. 13 is a graph showing an example of a bidding method in the case of two commodity items which are in the AND-bidding relationship.

FIG. 13 is a graphic representation of the algorithm for computing the total profit obtainable from the purchased items in the case of purchasing only 2 items. In other words, in the case where the bidding is made for two items, the selection of the items and the total profit therefrom can be computed by solving the linear equation represented by the graph of FIG. 13.

In FIG. 13, the price of a commodity X is given as x; the price of a commodity Y as y; the value of the commodity X as xm; the value of the commodity Y as ym; the value obtained when both of the two items are purchased as xym; the total purchasing fund as T. In the case of FIG. 13, it is assumed that T>xm, T>ym, xm+ym<T, and xym<T.

The straight line represented by x=xm is used to determine whether the commodity X should be purchased or not depending on whether its present price exceeds its value or not. Similarly, the straight line represented by y=ym is used for the same purpose in the case of Y. The region 70 formed by x>xm and y>ym and x+y>xym is a region where neither commodity X nor commodity Y is purchased. In the region 69 formed by x<xm and y>xym−xm, it is advantageous to purchase only the commodity X yielding larger profits. Conversely, in the region represented by y<ym and x>xym−ym corresponds to the region 71 wherein only the commodity Y should be purchased. The other region in FIG. 13 represented by x+y<xym corresponds to the region 72 wherein both the commodity X and the commodity Y should be purchased.

The item relationship formula 2 may represent composite relationship among bid items including the logical OR, AND and exclusive OR. However, from the practical and computational point of view, the bid commodity relationship is meaningful only when the logical AND is related with the exclusive OR and the resulting formula is further related with the logical OR. The reason is that, in the case of the logical AND, it is necessary to designate the expected value to the total of all the items represented by the logical AND, and thus it is necessary that each items of the logical AND should represent a specified commodity. Furthermore, since the exclusive OR is supposed to represent the desire of a bidder for purchasing the commodity A or commodity B, which commodity should be purchased exclusively, it becomes unclear in the case where the logical OR is included in a term of lower order.

Composite Item Relationship

Figure 14:
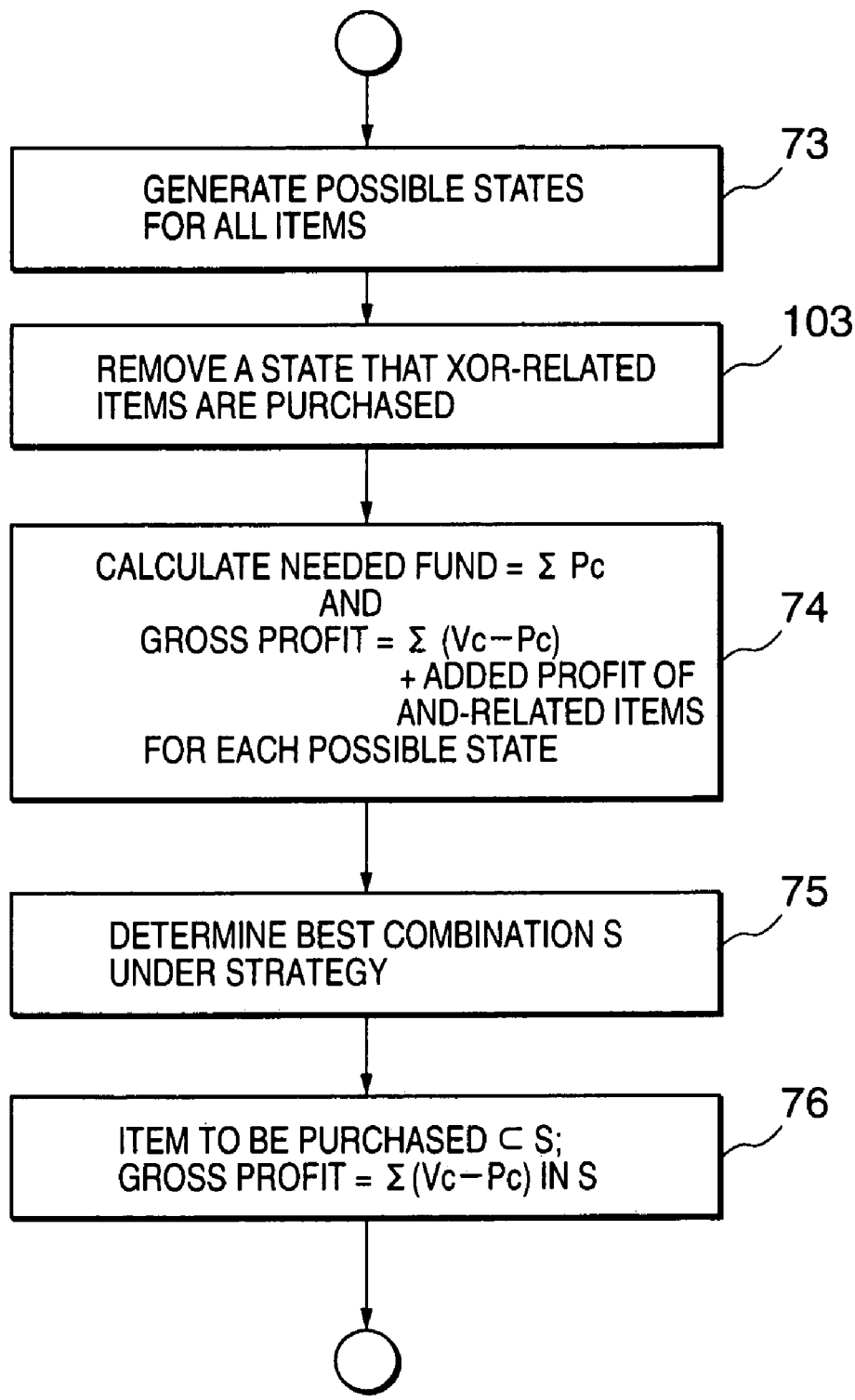
FIG. 14 is a flow chart showing a computation procedure of profit obtained from a plurality of commodity items which are in OR-, XOR-, and/or AND-bidding relationships.

FIG. 14 shows a general profit computation method for the composite item relationship formula. First, the strategy computation section 7 determines whether each of all the items is to be purchased or not to be purchased to produce $2^x$ possible states, where x is the number of all the items (step 73).

Next, of these possible states, a possible state for purchasing both the items relating to the exclusive OR is deleted (step 103). Subsequently, for each of the remaining possible states, the total price of the fund required for purchasing the items to be purchased at the present prices and a gross profit obtainable therefrom are computed by using the profit computation section 6 (step 74). Basically, the gross profit is the sum of differences between the values and the present prices of the individual items to be purchased, but, in the case where all the items related to AND are purchased, the special profit expectable from purchasing all commodity groups at a time should also be computed.

The strategy computation section 7 compares the profits computed in the above-described process to decide a best combination S of items under the strategy 1 (step 75). For instance, when the object of the strategy 1 is to maximize the profit at the present price level, the combination S that is the best combination of items should be formed by the items from which the largest possible profit can be expected. Then, the best combination S and the profit expectable therefrom are outputted as the to-be-purchased commodities list and the gross profit (step 76). The maximum profit retrieval method shown in FIG. 14 can be speeded by employing the pruning method, as described in FIG. 4.

The strategy exemplified in FIGS. 4-14 is one designed for maximizing the profit applicable only to the cases where the items are purchased based on only the present price level. However, this strategy is primarily designed only for maximizing the profit at the present price level, and thus such a strategy may work unfavorably when there are items which are currently on bidding, or when there is participation by other bidders which bring about adverse effects on the intended maximization of the profit. Variations of the strategy 1 will be discussed in the following.

Figure 15:
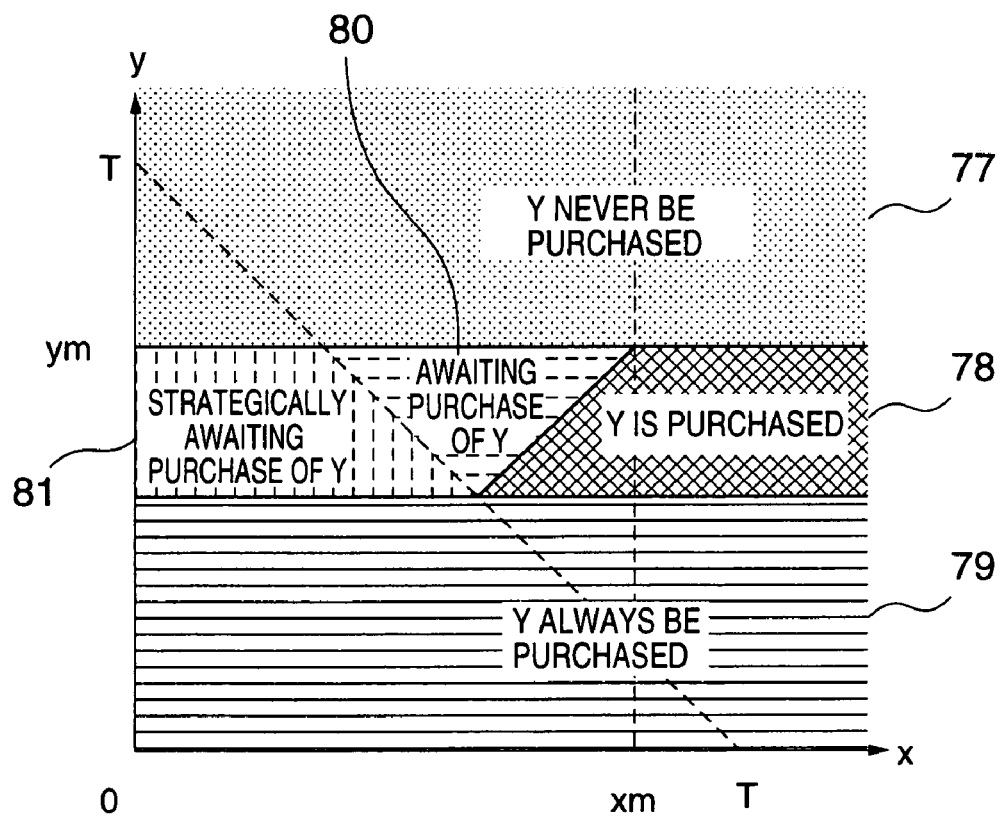
FIG. 15 is a graph showing a first example of a bidding strategy in the case of two commodity items which are in the OR-bidding relationship.

FIG. 15 illustrates a bidding strategy for a commodity Y under the conditions similar to those given in FIG. 5. For instance, in the region 77 where "the commodity Y should never be purchased", since y is larger than ym and therefore the profit cannot be expected from purchasing the commodity Y. As a result, the commodity Y will not be purchased regardless of the price x. of the commodity X.

On the other hand, in the region 79 where "the commodity Y should always be purchased", since y is smaller than (T+ym−xm)/2, regardless of the value of x, the commodity Y should be purchased to obtain the profit therefrom. Further, the region 78 "commodity Y should be purchased" is an area represented by y−ym<x−xm within the domain sandwiched between the region 77 and the region 79. The region 78 will remain to be a region where the profit can be maximized by purchasing the commodity Y even if the bidding is made for the commodity X at higher prices. The above-mentioned three regions 77, 78 and 79 are the regions where the best bidding for the commodity Y is possible even if the close of the bidding for the commodity Y is earlier than that of the bidding for the commodity X.

Next, the region 80, "awaiting the purchase of the commodity Y", is the region where the bidding for the commodity X may be made singly. The bidding for the commodity Y should be made only when there is participation by other bidders on commodity X, and the present price of the commodity X has been shifted into the region 78, "commodity Y is purchased." In the case of this region, a problem lies in that, when the close of the bidding for the commodity Y is earlier than that of the other commodity, it is impossible to strategically wait for the purchase of the commodity Y; for instance, if the bidding for the commodity X only is made without making the bidding for the commodity Y, and a bidder cannot buy the commodity X due to the rise of its price in the future, even the profit, which might have been able to obtain if the bidding for the commodity Y should have been made, will also be lost.

Lastly, the region 81 for "strategically awaiting the purchase of the commodity Y" is the region where a high profit can be realized by bidding for the commodity X, but, this region is used for purchasing the commodity Y for strategic purpose. In this case, there is the possibility that if the bidding price for the commodity X rises after bidding for the commodity Y, the condition of the region may be changed into that of region 80 for "awaiting the purchase of the commodity Y." In such a case, the bidding for the commodity Y is not allowed to be cancelled, and so, if the commodity X should be bought, then the amount of purchase exceeds the total price of the total fund T, with the result that the commodity X cannot be purchased because of the limit of the fund.

When the present price level is located in the region 80 for "awaiting the purchase of the commodity Y" or the region 81 for "strategically awaiting the purchase of the commodity Y", and when the distribution of expected values resulting from the future variation in the price of the commodity X is predictable, it is possible to make a decision based on a better strategy. By comparing the profit expectable from the bidding for the commodity Y and that expectable from not bidding for the commodity Y taking the distribution of the expected values into account, a better decision on bidding can be made.

When the distribution of the expected values cannot be predicted correctly, it is necessary for the bidder to establish another criterion for preventing the profit from decreasing substantially. As an example, there is an available strategy characterized by assuming that the ratio p1 between the profit which can be secured by bidding for the commodity Y and the profit which can be secured by bidding for the commodity X can be obtained by the following equation:

$$(ym-y)/(xm-x)=p1.$$

Therefore, a straight line represented by the equation is determined as follows:

$$y=p1*x-p1*xm+ym.$$

Strategically, when y is larger than the value given above, the commodity Y should not be purchased, while y is smaller, the commodity Y should be purchased.

Figure 16:
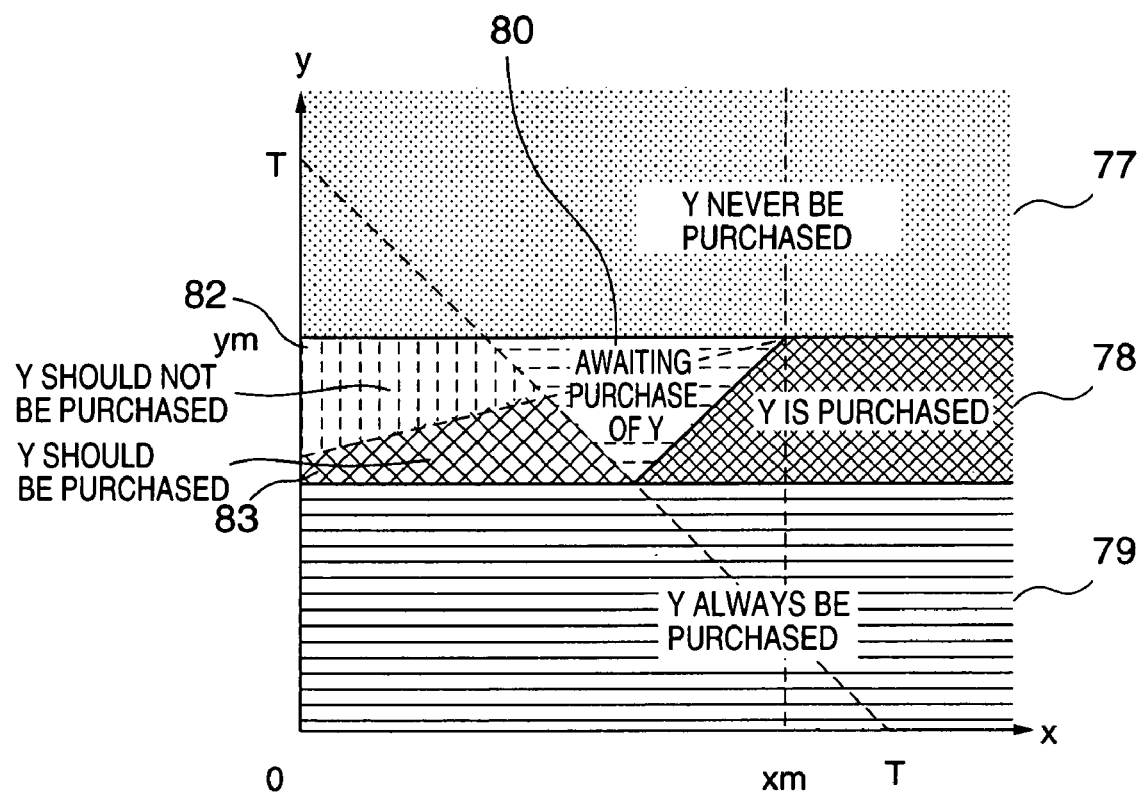
FIG. 16 is a graph showing a second example of a bidding strategy in the case of two commodity items which are in the OR-bidding relationship.

FIG. 16 shows an example in which the above-mentioned strategy is applied to the case of the region 81 for "strategically purchasing the commodity Y" given in FIG. 15. In the region 82 where "the commodity Y should not be purchased", it is advantageous to employ the strategy for not bidding on the commodity Y from the beginning, since the exclusive purchasing the commodity X would be likely to be more profitable because of the later rise of the price of the commodity X, but the later withdraw of the bidding on the commodity Y may not be allowed once the bidding is completed. On the other hand, in the region 83 where "the commodity Y should be purchased", it is recommendable for the bidder to make positive bidding on the commodity Y, since the expected profit gain for exclusive purchasing the commodity X is not so different from the profit for exclusive purchasing the commodity Y, even if it has become desirable to exclusively purchase the commodity X because of the later rise of the price of the commodity X.

Figure 17:
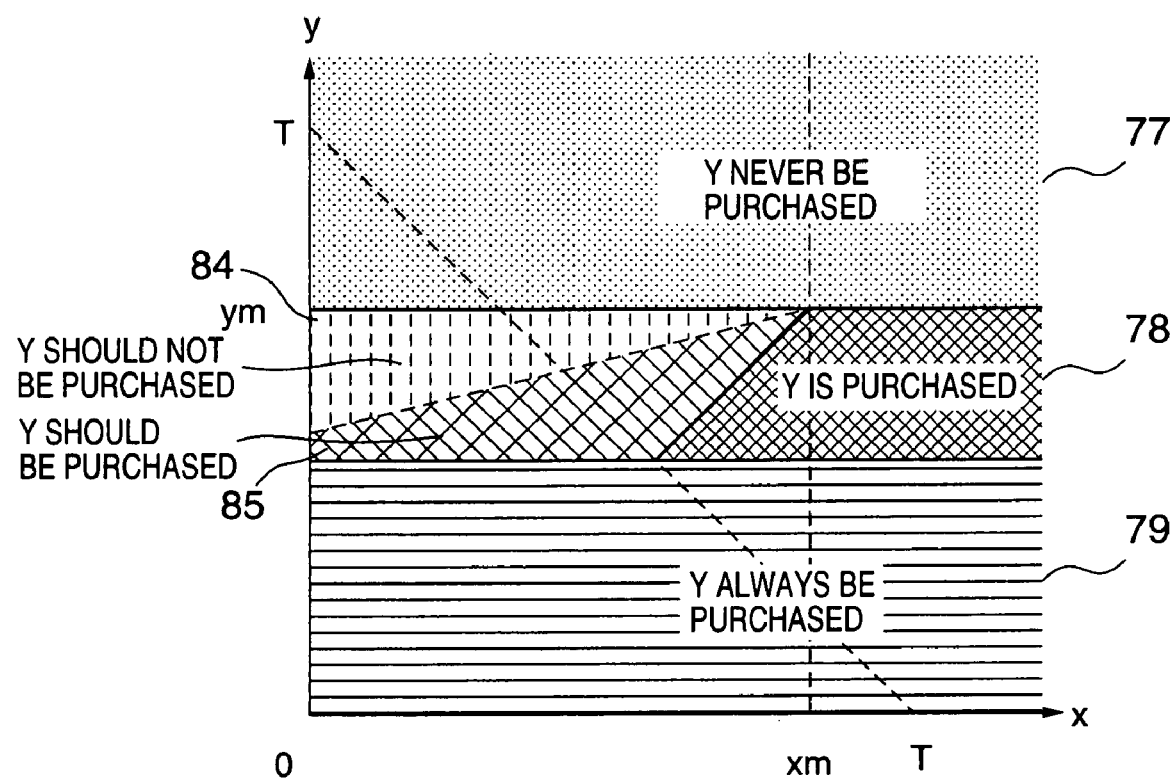
FIG. 17 is a graph showing a third example of a bidding strategy in the case of two commodity items which are in the OR-bidding relationship.

FIG. 17 shows another example of a strategic formula for determining whether the commodity Y should be purchased or not in the case where the close of the bidding on the commodity Y is earlier than that of the commodity X, but the strategy 80 for "awaiting the purchase of the commodity Y" cannot be employed. The region 84 for "the commodity Y should not be purchased" and the region 85 for "the commodity Y should be purchased" occupy greater areas than those given in FIG. 16.

FIG. 18 shows an example of the processing for determining whether the bidding on the commodity Y, one of the two items X, Y which are expressed in terms of the logical OR, should be made or not for maximizing the profit expectable therefrom under the strategy described above. The similar processing is also applicable to determine whether the commodity X should be purchased or not. The program executing such processing is inputted in advance as the strategy 1 by the user through the input device 100.

In FIG. 18, X and Y represent items; x and y, the present prices of the items X and Y; xm and ym, the values of the items X and Y; T, total purchasing fund; p1, a constant ratio specified by the strategy 1.

The strategy computation section 7 determines whether the following conditions are each satisfied;

$y<ym;$ (Condition 1)

$y<(T+ym-xm)/2;$ (Condition 2)

$y-ym<x-xm;$ (Condition 3)

Close of bidding on Y is earlier than that of X; (Condition 4)

$x+y>T;$ and (Condition 5)

$y>p1*x-p1*xm+ym.$ (Condition 6)

The strategy computation section 7 outputs the conclusion that the bidding on the commodity Y should not be made (step S7) in the following oases:
(1) the condition 1 is not satisfied (NO at step S1);
(2) the condition 1 is satisfied (YES at step S1), the conditions 2 and 3 are not satisfied (NO at steps S2 and S3), and the conditions 4 and 6 are satisfied (YES at steps S4 and S6); and
(3) the condition 1 is satisfied (YES at step S1), the conditions 2-5 are not satisfied (NO at steps S2-S5), and the condition 6 is satisfied (YES at step S6).

Further, the strategy computation section 7 outputs the conclusion that the bidding on the commodity Y should be made (step S8) in the following cases:
(4) the conditions 1 and 2 are satisfied (YES at steps S1 and S2);
(5) the condition 1 is satisfied (YES at step S1), the condition 2 is not satisfied (NO at step S2), the condition 3 is satisfied (YES at step S3);
(6) the condition 1 is satisfied (YES at step S1), the conditions 2 and 3 are not satisfied (NO at steps S2 and S3), the condition 4 is satisfied (YES at step S4), and the condition 6 is not satisfied (NO at step S6); and
(7) the condition 1 is satisfied (YES at step S1) and the conditions 2-6 are not satisfied (NO at steps S2-S6).

Furthermore, the strategy computation section 7 outputs the conclusion that the bidding on the commodity Y should be awaited (step S9) in the case where the condition 1 is satisfied (YES at step S1), the conditions 2-4 are not satisfied (NO at steps S2-S4), and the condition 5 is satisfied (YES at step S5).

As described above, in bidding, a combination of items for maximizing the future profit may vary depending on variations of prices of the items other than the bid items, and thus the strategy for defining the conditions for the bidding is important. The strategy as shown in FIG. 18 is employed for such purpose; for instance, this strategy is employed in selecting best items in the cases as shown in FIG. 4, FIG. 8 and FIG. 12.

The bidding condition storage device 19 as shown in FIGS. 2 and 3 is used to provide the profit computation section 6 and the strategy computation section 7 with the actual bid history information regarding the items for which the biddings have been made. Taking into consideration the case where there are items for which the biddings have been made but have not been allowed to be cancelled, the profit computation section 6 uses the actual bid history information to perform the profit computation only in the case where the item for which the bidding has been made should be purchased and the strategy computation section 7 uses the actual bid history information to perform strategy computation of the strategy including the item for which the bidding has been made.

Next, the strategy applicable to the case where the bidding is continued even in the region where the profit becomes negative due to the bidding made in the past will be explained referring to FIG. 19.

Figure 19:
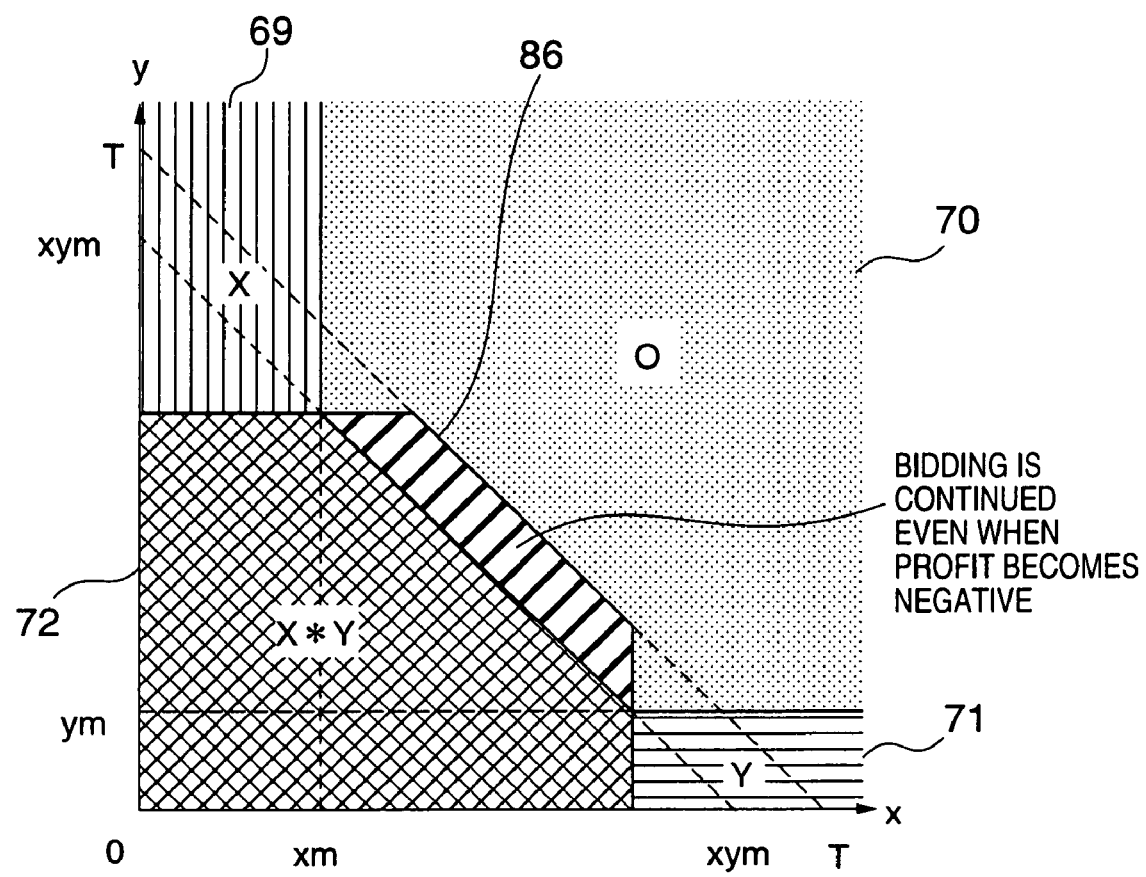
FIG. 19 is a graph showing a first example of a bidding strategy in the case of two commodity items which are in the AND-bidding relationship.

FIG. 19 shows the case, being similar to the case of FIG. 13, where the relationship between the commodity X and the commodity Y is defined in terms of the logical AND. In the region 86 of FIG. 19, when the strategy for minimizing the loss is to be employed, the bidding will be continued even if the profit becomes negative. In other words, in the region 86, even if it is known that the profit will become negative by bidding for one of the items, the bidding will be continued on the expectation that the loss can be minimized owing to the bidding for the other commodity.

For instance, when the biddings for the commodity X and the commodity Y are made in the case of y>ym, and the price of the commodity X has risen to the level where x+y>xym, causing the bidder to drop the purchase of the commodity X and resulting in the purchasing of the commodity Y only, the loss becomes y–ym. On the other hand, when both the commodity X and the commodity Y are purchased while knowing that the commodity X yields negative profit, the final loss will be x+y–xym. The difference between these two losses is xym–ym–x, and xym–ym–x>0, that is, where x<xym–ym, the loss deriving from the commodity Y exceeds the loss resulting from purchasing both the commodity X and the commodity Y, and thus the bidding for the commodity X will be continued. The effect is the same with the case where the price of the commodity Y has risen.

Further, when x+y exceeds the amount of the total fund T, no fund is available to make the payment for the purchased items, and so it becomes necessary to discontinue the bidding operation even if the resulting loss is considerable.

From the foregoing, in the region 86 where "the bidding should be continued even if the profit becomes negative", if the strategy for minimizing the loss is employed, the bidding will be continued even when the profit has become negative.

Figure 20:
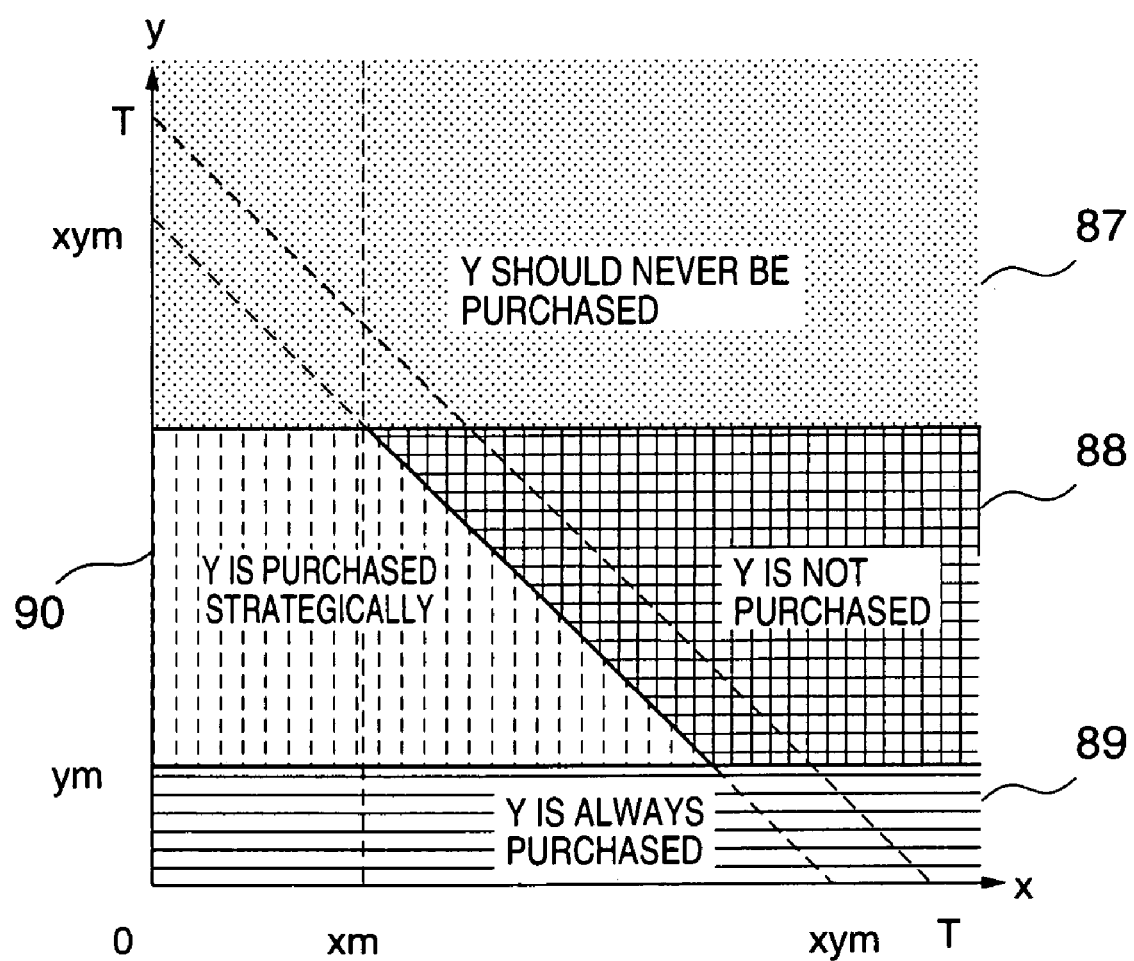
FIG. 20 is a graph showing a second example of a bidding strategy in the case of two commodity items which are in the AND-bidding relationship.

FIG. 20 shows a strategy designed for considering the factors other than the maximum profit in making bidding for the items so as to prevent the bidding from entering the region 86 where "the bidding is continued even if the profit becomes negative."

As shown in FIG. 20, in the region 89 represented by y<y for "the commodity Y should always be purchased", the profit can be expected under any conditions, bidding should be made for the commodity Y. On the other hand, with respect to the region 87 represented by y>xym−xm for "the commodity Y should never be purchased", no strategy justifies the purchase of the commodity Y. Further, the area represented by x+y>xym within the domain between the above-mentioned two regions is the region 88 for "the commodity Y will not be purchased" unless the bidding for the commodity Y has already been made, since the profit becomes negative. In the region 90 for "the purchase of the commodity Y should be made strategically", strategic consideration should be taken, since such bidding may result in negative profit due to the reason that the bidding for the commodity Y cannot be cancelled when the price of the commodity X has risen later.

Figure 21:
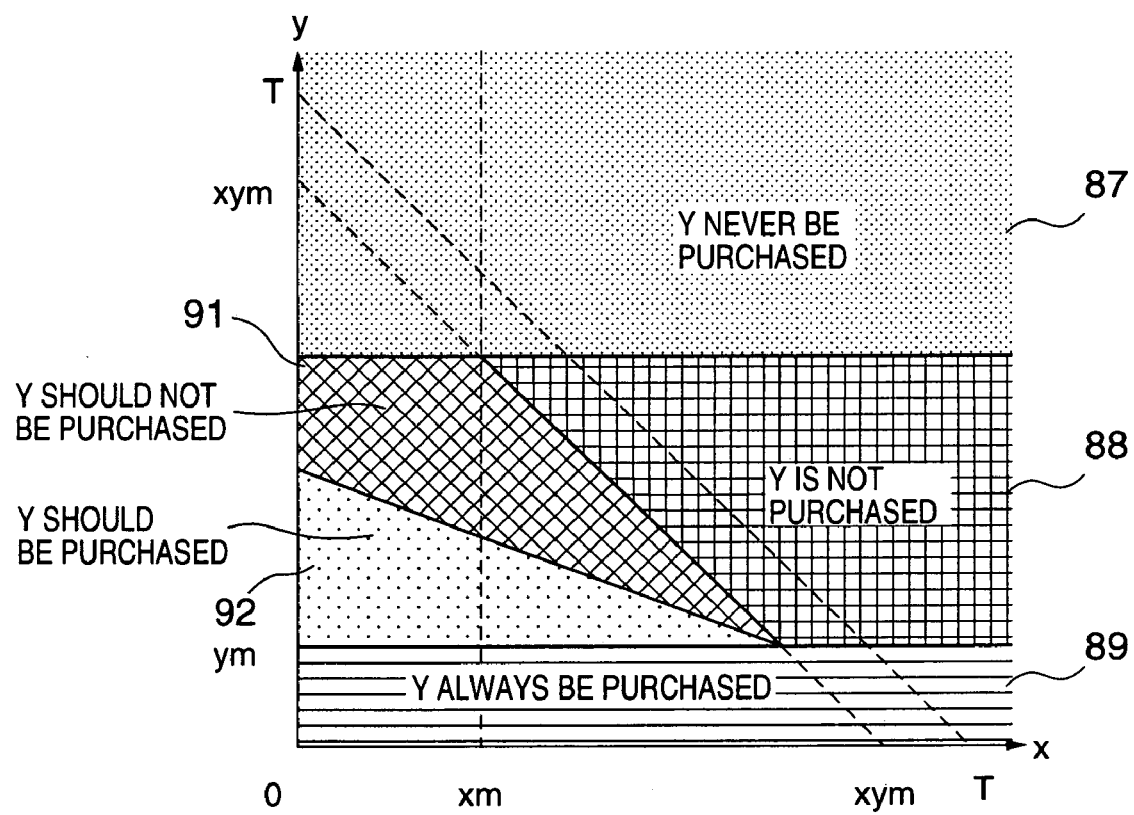
FIG. 21 is a graph showing a third example of a bidding strategy in the case of two commodity items which are in the AND-bidding relationship.

FIG. 21 shows an actual example of the strategy applicable to the region 90 for "the commodity Y should be purchased for strategic purposes" as is shown in FIG. 20. The ratio, p2, between the predictable largest loss, (y−ym), and the expectable highest profit, (xym−x−y), can be expressed by the equation given below:

$(y-ym)/(xym-x-y)=p2.$

Transforming the above equation, the equation given below can be obtained:

$y=(p2*xym-p2*x+ym)/(1+p2).$

Since it can be predicted that the loss will increase in the region above the given line, this region corresponds to the region 91 for "the commodity Y should not be purchased." On the other hand, in the region under the line, the expected maximum profit is larger than loss, and so this region corresponds to the region 92 for "commodity Y should be purchased."

FIG. 22 shows an example of the processing for determining, in order to maximize the profit, whether the bidding should be made or not for the commodity Y that is one of X and Y, which are expressed in terms of the logical AND. The similar determination can be made as to the commodity X too. The program for executing such processing should be inputted in advance by the user.

In FIG. 22, X and Y represent items; x and y, the present prices of the commodity X and the commodity Y; xm and ym, the values of the commodity X and the commodity Y; xym, the combinatorial value obtainable when the items X and Y are both purchased; T, total purchasing fund; p2, a constant ratio specified by the strategy 1.

Referring to FIG. 22, the strategy computation section 7 determines whether the following conditions are satisfied (steps S11 through S14).

| | |
|---|---|
| $y<ym$ | (Condition 1) |
| $y>xym-xm$ | (Condition 2) |
| $x+y>xym$ | (Condition 3) |
| $y>(p2*xym-p2*x+ym)/(1+p2)$ | (Condition 4) |

Further, the strategy computation section 7 outputs the conclusion that the bidding should be made for the commodity Y (step S15) when the condition 1 is satisfied (YES at step S11) or when the conditions 1-4 are not satisfied (NO at steps S11-S14). Further, the strategy computation section 7 outputs the conclusion that the bidding for the commodity Y should not be made (step S16) when the condition 1 is not satisfied (NO at step S11) and one of the conditions 2-4 is satisfied (YES at step S12, S13, or S14).

As another example of the strategy applicable in the region 90 for "the commodity Y should be purchased for strategic purpose", as shown in FIG. 20, there is a method for computing the profit based on the probability that the price of the commodity X rises to the level corresponding to the region 88 for "the commodity Y should not be purchased" as shown in FIG. 20. For the purpose of this strategy, the information about the distribution of the expectation concerning the price variation of the commodity X is necessary.

Figure 23:
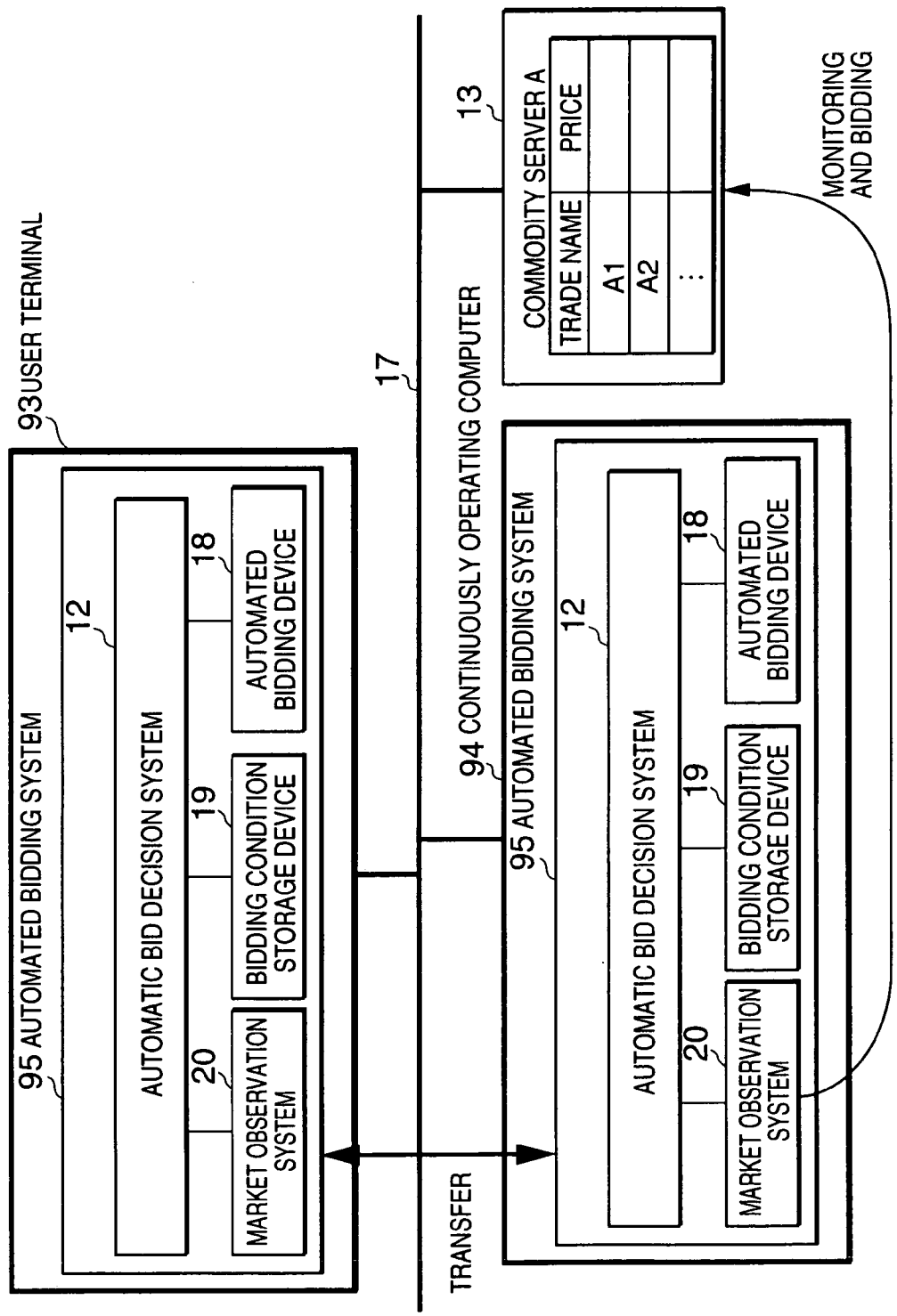
FIG. 23 is a block diagram showing an example of movement of an automated bidding agent according to the present invention.

FIG. 23 shows a method for periodically monitoring the market by transferring an automatic bidding system 95 from a user's terminal 93 to a continuously operating computer 94. Since the user's terminal is powered off sometimes, the periodical monitoring of price fluctuations and automatic bidding cannot be performed in many cases.

To ensure the periodical monitoring of the market and the automatic bidding, the automatic bidding system 95 is transferred to the continuously operating computer 94 to monitor the commodity server 13. In the case where a plurality of items are distributed among plural commodity servers, the automatic bidding system 95 may reside on the continuously operating computer 94 and access the plural commodity servers 13, or may be transferred near the plural commodity servers 13 to monitor the price information. Further, the automatic bidding system may be transferred near the commodity server 13 to perform the bidding operation. In such a case, the reduction of delay in bidding responding to price fluctuation can be expected.

Figure 24:
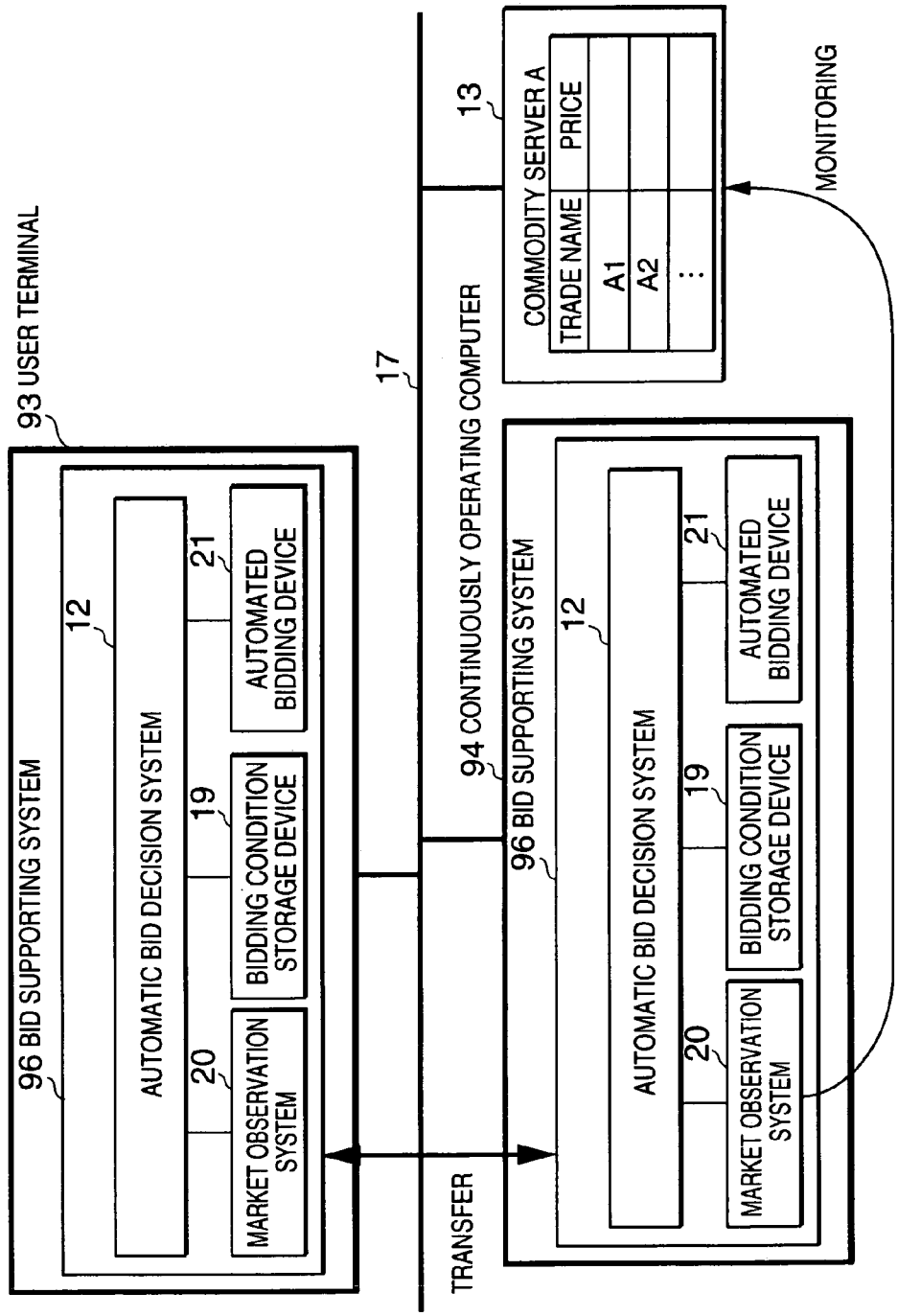
FIG. 24 is a block diagram showing an example of movement of a bid supporting agent according to the present invention.

FIG. 24 shows a method for periodically monitoring the market by transferring a bidding support system 96 from the user's terminal 93 to the continuously operating computer 94. As described above, the user's terminal 93 cannot be used for the periodical monitoring of price fluctuations since the power is turned off sometimes. Thus, after the input by the user is finished, the bidding support system 96 is transferred to the continuously operating computer 94 in order to be used for monitoring the commodity server 13 through this computer. In the case where plural items are distributed among the plural commodity servers 13, the bidding support system 96 may reside on the continuously operating computer 94 and access the plural servers 13. The bidding support system 96 may monitor the price information after being transferred near the plural servers 13. The communication with the user may be made either by using the electronic mail, or by having the bidding support system 96 move to the user's terminal when the user has logged-in to the terminal.

EXAMPLE 1

It is assumed that the bidding for a commodity item C is made, on a commodity server A, while the bidding for a commodity item D is made on a commodity server B, and further the value of the commodity item C to the bidder is 200, while that of the commodity item D is 100. Here, the relationship formula 2 of the items C and D is expressed in terms of the logical OR of the commodity items C and D, and the total fund is assumed to be 250. If the present price of the commodity C is 100 and that of the commodity D is 50, then, under the strategy for directly maximizing the profit, the profit expectable by bidding for both the commodity C and the commodity D can be given as 200+100-100-50=150. Under this condition, if the strategy is as described in FIG. 15, since both the commodity items C and D belong to the region 79 for "both the commodity C and the commodity D should always be purchased", the bidding for both the items can be justified. The result is the same even if the strategy given in FIG. 18 is employed.

On the other hand, when the price of the commodity C remains to be 100, while the price of the commodity D is 80, if the strategy designed for directly maximizing the profit is employed, then bidding is made for both the items and the expectable profit can be given as:

200+100-100-80=120.

However, in the case of the strategic bidding as described in FIG. 15, the commodity C belong to the region 79 for "the commodity C should always be purchased", while the commodity D belongs to the region 81 for "the commodity D should be purchased strategically." In the case represented by the flow chart given in FIG. 18, when the strategy p1=0.5 is employed, this case can be expressed as:

0.5*100-0.5*200+100=50.

In this case, since the price 80 is larger than 50, the bidding should not be made for the commodity D. On the other hand, when the price of the commodity C rises to 162, the price condition can be given as:

0.5*162-0.5*200+100=81.

Since the price 80 is smaller than 81, the bidding should be made for the commodity D.

EXAMPLE 2

As another example, it is assumed that the bidding for a commodity E is made on the server A, while the bidding for a commodity F is mad on the server B and the value of the commodity E for the bidder is 100, while the value of the commodity F is 50. The relationship formula for these items is expressed in terms of the logical AND of the commodity E and the commodity F, and the value obtained when both the items are purchased is 250 and the total purchasing fund is assumed to be 300. When the present price of the commodity E is 60 and that of the commodity F is 110, if the strategy for directly maximizing the profit is employed, then the expectable profit from the biddings for both the commodity E and the commodity F can be given as:

250-60-110=80.

In this condition, however, if evaluated as described in FIG. 20, the commodity F belongs to the region 90 for "the purchasing should be made strategically." In the case as shown in FIG. 22, if the strategy, p2=0.5, is employed, the boundary between the decision for "the commodity should be purchased" and the decision for "the commodity should not be purchased" can be given as:

(0.5*250-0.5*60+50)/(1+0.5)=96.6.

Since the price 110 of the commodity F is larger than 96.6, it is concluded that the commodity F should not be purchased. On the other hand, when the strategy, p2=0.8, is employed, the formula is:

(0.8*250-0.8*60+50)/(1+0.8)=112.22.

This justifies the strategy for purchasing the commodity F.

Figure 25:
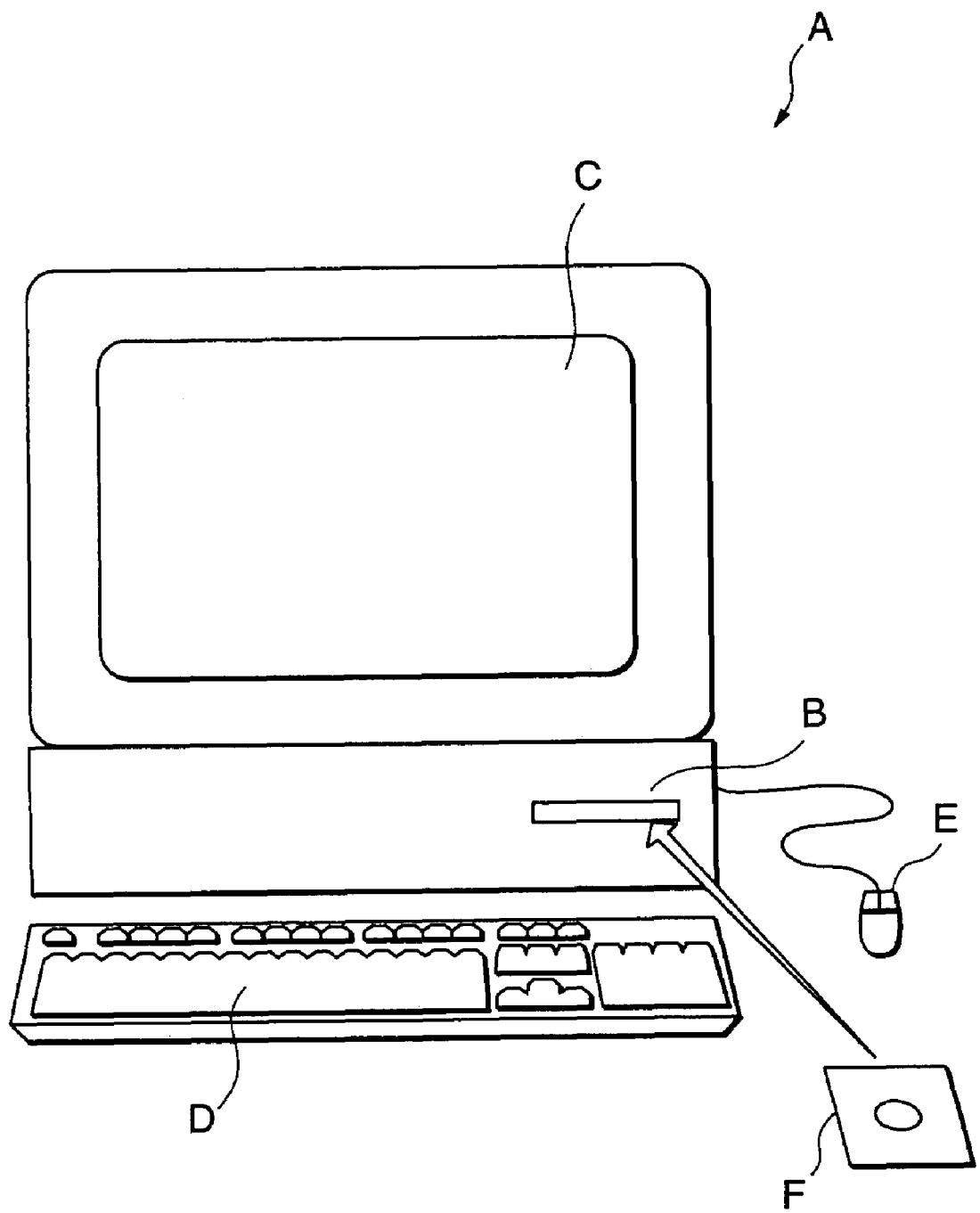
FIG. 25 is a diagram showing an example of a computer to which the present invention is applied.

FIG. 25 shows an example of the computer system according to the present invention. A computer A is composed of a main unit B of the computer including a central processing unit (CPU), a main memory, a hard disc unit, a floppy disc unit, a CD-ROM unit or the like, a display unit C, a keyboard D, and a mouse E. A machine-readable storage media F, such as a floppy disc, CD-ROM and the like is designed for storing a program.

The program stored in the memory F is read by the main unit B of the computer to control the operation of the unit B. More specifically, the program instructs the main unit B of the computer to implement on the computer the automatic bidding system 12 in the case of the embodiment shown in FIG. 1; the automatic bid decision system 12, the automatic bidding system 18, the bidding condition memory 19 and the market observation system 20 in the case of the embodiment shown in FIG. 2; the automatic bid decision system 12, the bidding condition memory 19, the market observation system 20, the bid recommendation system 21 and the bid input device 22 in the case of the embodiment shown in FIG. 3.

As described above, according to the present invention, it is possible to compute the profit expectable from a given combination of items based on the information concerning the values of the items in one or more market, the upper limit of the available fund, and the actual prices of the items. Therefore, the user is provided with the information about a combination of items which can promise the largest possible profit. In other words, the bidders who have the criteria of values concerning the items in more than one market can be effectively supported.

Further, according to the present invention, the automatic bidding system or the bidding support system, which can respond to the price fluctuations by periodically monitoring the market prices of the items at all times can be easily constructed. The present invention provides the users with a disclosed system of the profit computation for enabling them to compute the largest possible profit based on the information inputted by the users themselves at all times reflecting market fluctuations. Furthermore, the present invention enables the users, when necessary, to utilize the continuously operating computer apart from the users' terminal by using the function of a mobile agent, for the purposes of the monitoring of the market and the continuous execution of the profit computation process.

What is claimed is:

1. In a computer, a method for determining whether or not to bid on a bid item Y, the method comprising:
  a) storing, in a memory device, a logical formula representing a logical OR of a bid item X and the bid item Y, a value table containing values $x_m$ and $y_m$ of respective ones of the bid items X and Y, present prices x and y of respective ones of the bid items X and Y, and a total purchasing fund T;

b) determining, by the computer, whether y<ym (hereafter, called Condition 1) is satisfied;

c) determining, by the computer, whether y<(T+ym−xm)/2 (hereafter, called Condition 2) is satisfied;

d) determining, by the computer, whether y−ym<x−xm (hereafter, called Condition 3) is satisfied;

e) determining, by the computer, not to bid on the bid item Y in a case where the Condition 1 is not satisfied;

f) determining, by the computer, to bid on the bid item Y in cases where (i) the Conditions 1 and 2 are satisfied, or (ii) the Condition 1 is satisfied, the Condition 2 is not satisfied, and the Condition 3 is satisfied; and g) determining, by the computer in accordance with a parameterized decision function, whether or not to bid on the bid item Y in a case where the Condition 1 is satisfied and the Conditions 2 and 3 are not satisfied.

2. The method of claim 1, wherein at least one parameter used in the parameterized decision function is set in accordance with a bidding strategy; and wherein the bidding strategy takes into consideration a possible rise of the price of each of the bid items X and Y due to participation of a third party to the bidding on the bid items X and Y in the future.

3. The method of claim 1, wherein the parameterized decision function comprises:

determining, by the computer, whether a close of bidding for the bid item Y is earlier than a close of bidding for the bid item X (hereinafter, called Condition 4);

determining, by the computer, whether x+y>T (hereinafter, called Condition 5) is satisfied;

determining, by the computer, whether y>p1*x−p1*xm+ym (hereinafter, called Condition 6) is satisfied, wherein p1 is a parameter that is able to be set to a selected constant value;

determining, by the computer, not to bid on the bid item Y in cases where (i) the Conditions 4 and 6 are satisfied, or (ii) the Conditions 4 and 5 are not satisfied and the Condition 6 is satisfied; and determining, by the computer, to bid on the bid item Y in cases where (i) the Condition 4 is satisfied and the Condition 6 is not satisfied, or (ii) the Conditions 4 and 5 and 6 are not satisfied.

4. The method of claim 3, wherein the parameter p1 is set in accordance with a bidding strategy; and wherein the bidding strategy takes into consideration a possible rise of the price of each of the bid items X and Y due to participation of a third party to the bidding on the bid items X and Y in the future.

5. The method of claim 1, further comprising:

h) providing by the computer if it is determined by the computer to bid on the bid item Y, at least one of (1) a bid on the bid item Y and (2) a recommendation to a user to bid on the bid item Y.

6. In a computer, a method for determining whether or not to bid on a bid item Y, the method comprising:

a) storing, in a memory device, a logical formula representing a logical AND of a bid item X and the bid item Y, a value table containing values xm and ym of respective ones of the bid items X and Y, present prices x and y of respective ones of the bid items X and Y, a combinatorial value xym obtainable when the bid items X and Y are both purchased, and a total purchasing fund T;

b) determining, by the computer, whether y<ym (hereafter, called Condition 1) is satisfied;

c) determining, by the computer, whether y>xym−xm (hereafter, called Condition 2) is satisfied;

d) determining, by the computer, whether x+y>xym (hereafter, called Condition 3) is satisfied;

e) determining, by the computer, to bid on the bid item Y in a case where the Condition 1 is satisfied;

f) determining, by the computer, not to bid on the bid item Y when the Condition 1 is not satisfied and at least one of the Conditions 2 and 3 is satisfied; and g) determining, by the computer in a case where the Conditions 1 and 2 and 3 are not satisfied, whether or not to bid on the bid item Y based on a result that is calculated in accordance with a parameterized decision equation.

7. The method of claim 6, wherein at least one parameter in the parameterized decision equation is set in accordance with a bidding strategy; and wherein the bidding strategy takes into consideration a possible rise of the price of each of the bid items X and Y due to participation of a third party to the bidding on the bid items X and Y in the future.

8. The method of claim 6, wherein the parameterized decision equation is p2*xym−p2*x+ym;

wherein p2 is a parameter that is able to be set to a selected constant value; and wherein the step g), comprises:

determining, by the computer, whether y>p2*xym−p2*x+ym (hereinafter, called Condition 4) is satisfied;

determining, by the computer, to bid on the bid item Y in a case where the Conditions 1 and 2 and 3 and 4 are not satisfied; and determining, by the computer, not to bid on the bid item Y in a case where the Conditions 1 and 2 and 3 are not satisfied and the Condition 4 is satisfied.

9. The method of claim 8, wherein the parameter p2 in the parameterized decision equation is set in accordance with a bidding strategy; and wherein the bidding strategy takes into consideration a possible rise of the price of each of the bid items X and Y due to participation of a third party to the bidding on the bid items X and Y in the future.

10. The method of claim 6, wherein the parameterized decision equation is [(p2*xym−p2*x+ym)/(1+p2)];

wherein p2 is a parameter that is able to be set to a selected constant value; and wherein the step g), comprises:

determining, by the computer, whether y>[(p2*xym−p2*x+ym)/(1+p2)] (hereinafter, called Condition 4) is satisfied;

determining, by the computer, to bid on the bid item Y in a case where the Conditions 1 and 2 and 3 and 4 are not satisfied; and determining, by the computer, not to bid on the bid item Y in a case where the Conditions 1 and 2 and 3 are not satisfied and the Condition 4 is satisfied.

11. The method of claim 6, wherein the bid item Y is a different type of item than the bid item X.

12. The method of claim 6, further comprising:

h) providing, by the computer if it is determined by the computer to bid on the bid item Y, at least one of (1) a bid on the bid item Y and (2) a recommendation to a user to bid on the bid item Y.

13. A method for determining whether or not to bid on a first bid item in a first auction, the method implemented in a computer, the method comprising:

determining whether or not a present price of the first bid item in the first auction is greater than or equal to a first preset value, the first preset value set to an estimated value of the first bid item;

determining not to bid on the first bid item when it has been determined that the present price of the first bid item in the first auction is greater than or equal to the first preset value;

determining, when it has been determined that the present price of the first bid item in the first auction is not greater than or equal to the first preset value, whether or not the present price of the first bid item in the first auction is less than one-half of a difference of (i) a sum of a total purchasing fund and the first preset value and (ii) a second preset value, the second preset value set to an estimated value of a second bid item that is able to be bid for in a second auction;

determining to bid on the first bid item when it has been determined that the present price of the first bid item in the first auction is less than one-half of the difference of (i) the sum of the total purchasing fund and the first preset value and (ii) the second preset value;

determining, when it has been determined that the present price of the first bid item in the first auction is not less than one-half of the difference of (i) the sum of the total purchasing fund and the first preset value and (ii) the second preset value, whether or not a difference of the present price of the first bid item in the first auction and the first preset value is less than a difference of a present price of the second bid item in the second auction and the second preset value; and determining to bid on the first bid item when it has been determined that the difference of the present price of the first bid item in the first auction and the first preset value is less than the difference of the present price of the second bid item in the second auction and the second preset value.

14. The method of claim 13,
wherein the first bid item is a different type of item than the second bid item.

15. The method of claim 13,
wherein the first auction is separate from the second auction.

16. The method of claim 13,
wherein the first bid item is offered for bid by a first seller;
wherein the second bid item is offered for bid by a second seller; and
wherein the first seller is different from the second seller.

17. The method of claim 13, further comprising:
determining, when it has been determined that the difference of the present price of the first bid item in the first auction and the first preset value is not less than the difference of the present price of the second bid item in the second auction and the second preset value, whether or not a close of bidding for the first bid item in the first auction is earlier than a close of bidding for the second bid item in the second auction; and
determining, when it has been determined that the close of bidding for the first bid item in the first auction is earlier than the close of bidding for the second bid item in the second auction, whether or not to bid on the first bid item based on a result that is calculated in accordance with a parameterized decision equation.

18. The method of claim 17,
wherein at least one parameter in the parameterized decision equation is set in accordance with a bidding strategy; and
wherein the bidding strategy takes into consideration a possible rise of the price of each of the first bid item and the second bid item due to participation of a third party to the bidding on the first bid item and the second bid item in the future.

19. The method of claim 17,
wherein the parameterized decision equation is specified by a product of a parameter value and the present price of the second bid item in the second auction minus a product of the parameter value and the second preset value plus the first preset value;
wherein the parameter value is able to be set to a selected constant value; and
wherein the step of determining, when it has been determined that the close of bidding for the first bid item in the first auction is earlier than the close of bidding for the second bid item in the second auction, whether or not to bid on the first bid item based on the result that is calculated in accordance with the parameterized decision equation, comprises:
determining, when it has been determined that the close of bidding for the first bid item in the first auction is earlier than the close of bidding for the second bid item in the second auction, whether or not the present price of the first bid item in the first auction is greater than the product of the parameter value and the present price of the second bid item in the second auction minus the product of the parameter value and the second preset value plus the first preset value;
determining not to bid on the first bid item when it has been determined that the present price of the first bid item in the first auction is greater than the product of the parameter value and the present price of the second bid item in the second auction minus the product of the parameter value and the second preset value plus the first preset value; and
determining to bid on the first bid item when it has been determined that the present price of the first bid item in the first auction is not greater than the product of the parameter value and the present price of the second bid item in the second auction minus the product of the parameter value and the second preset value plus the first preset value.

20. The method of claim 13, further comprising:
determining, when it has been determined that the difference of the present price of the first bid item in the first auction and the first preset value is not less than the difference of the present price of the second bid item in the second auction and the second preset value, whether or not a close of bidding for the first bid item in the first auction is earlier than a close of bidding for the second bid item in the second auction;
determining, when it has been determined that the close of bidding for the first bid item in the first auction is not earlier than the close of bidding for the second bid item in the second auction, whether or not the price of the first bid item in the first auction plus the price of the second bid item in the second auction is less than the total purchasing fund; and
determining, when it has been determined that the price of the first bid item in the first auction plus the price of the second bid item in the second auction is less than the total purchasing fund, whether or not to bid on the first bid item based on a result that is calculated in accordance with a parameterized decision equation.

21. The method of claim 13, further comprising:

providing, by the computer if it is determined to bid on the first bid item, at least one of (1) a bid on the first bid item and (2) a recommendation to a user to bid on the first bid item.

22. A method for determining whether or not to bid on a first bid item in a first auction, the method implemented in a computer, the method comprising:

determining whether or not a present price of the first bid item in the first auction is less than a first preset value, the first preset value set to an estimated value of the first bid item;

determining to bid on the first bid item when it has been determined that the present price of the first bid item in the first auction is less than the first preset value;

determining, when it has been determined that the present price of the first bid item in the first auction is not less than the first preset value, whether or not the present price of the first bid item in the first auction is greater than a difference between a combinatorial value and a second preset value, the second preset value set to an estimated value of a second bid item that is able to be bid for in a second auction, the combinatorial value set to an estimated value realizable when both the first bid item and the second bid item are obtained;

determining not to bid on the first bid item when it has been determined that the present price of the first bid item in the first auction is greater than the difference between the combinatorial value and the second preset value;

determining, when it has been determined that the present price of the first bid item in the first auction is not greater than the difference between the combinatorial value and the second preset value, whether or not a sum of the present price of the first bid item in the first auction and the present price of the second bid item in the second auction is greater than the combinatorial value; and determining not to bid on the first bid item when it has been determined that the sum of the present price of the first bid item in the first auction and the present price of the second bid item in the second auction is greater than the combinatorial value.

23. The method of claim 22, wherein the first bid item is a different type of item than the second bid item.

24. The method of claim 22, wherein the first auction is separate from the second auction.

25. The method of claim 22, wherein the first bid item is offered for bid by a first seller;

wherein the second bid item is offered for bid by a second seller; and wherein the first seller is different from the second seller.

26. The method of claim 22, further comprising:

determining, when it has been determined that the sum of the present price of the first bid item in the first auction and the present price of the second bid item in the second auction is not greater than the combinatorial value, whether or not to bid on the first bid item based on a result that is calculated in accordance with a parameterized decision equation.

27. The method of claim 22, further comprising:

providing, by the computer if it is determined to bid on the first bid item, at least one of (1) a bid on the first bid item and (2) a recommendation to a user to bid on the first bid item.

\* \* \* \* \*